US012478939B2

(12) United States Patent
Shaner et al.

(10) Patent No.: US 12,478,939 B2
(45) Date of Patent: Nov. 25, 2025

(54) MOVING BED REACTOR FOR HYDROCARBON PYROLYSIS

(71) Applicant: CZero Inc., Goleta, CA (US)

(72) Inventors: Samuel Shaner, Goleta, CA (US); Brett Parkinson, Goleta, CA (US); Andrew Caldwell, Goleta, CA (US)

(73) Assignee: CZero Inc., Goleta, CA (US)

( * ) Notice: Subject to any disclaimer, the term of this patent is extended or adjusted under 35 U.S.C. 154(b) by 174 days.

(21) Appl. No.: 18/040,397

(22) PCT Filed: Aug. 6, 2021

(86) PCT No.: PCT/US2021/044864
§ 371 (c)(1),
(2) Date: Feb. 2, 2023

(87) PCT Pub. No.: WO2022/032047
PCT Pub. Date: Feb. 10, 2022

(65) Prior Publication Data
US 2023/0313049 A1 Oct. 5, 2023

Related U.S. Application Data

(60) Provisional application No. 63/062,038, filed on Aug. 6, 2020.

(51) Int. Cl.
*B01J 8/12* (2006.01)
*C01B 3/28* (2006.01)

(52) U.S. Cl.
CPC *B01J 8/12* (2013.01); *C01B 3/28* (2013.01); *B01J 2208/0038* (2013.01); *B01J 2208/00513* (2013.01)

(58) Field of Classification Search
None
See application file for complete search history.

(56) References Cited

U.S. PATENT DOCUMENTS

| | | | | |
|---|---|---|---|---|
| 2,408,600 A * | 10/1946 | Clyde | B01J 8/1881 | 422/216 |
| 2,530,731 A * | 11/1950 | Bearer | B01J 8/087 | 422/216 |
| 2,748,060 A * | 5/1956 | Hicks | B01J 8/12 | 422/223 |

(Continued)

FOREIGN PATENT DOCUMENTS

| | | |
|---|---|---|
| FR | 2138504 A2 * | 1/1973 |
| WO | 2022032047 A1 | 2/2022 |

OTHER PUBLICATIONS

Wang et al. Aluminum and silicon based phase change materials for high capacity thermal energy storage. Applied Thermal Engineering 89 (2015) 204-208. (Year: 2015).*

(Continued)

*Primary Examiner* — Jennifer A Leung
(74) *Attorney, Agent, or Firm* — Andrew M. Metrailer; Conley Rose, P.C.

(57) ABSTRACT

A heat transfer media comprises a particle. The particle comprises a discontinuous phase and a matrix material. The discontinuous phase is disposed within the matrix material, and the matrix material has a higher melting point than the discontinuous phase. The discontinuous phase has a melting point selected to be within a reaction temperature range.

20 Claims, 13 Drawing Sheets

(56) References Cited

U.S. PATENT DOCUMENTS

| | | | | | |
|---|---|---|---|---|---|
| 2,769,693 | A * | 11/1956 | Bearer | F28C 3/14 422/111 |
| 2,943,040 | A * | 6/1960 | Weisz | C10G 11/16 208/91 |
| 4,421,661 | A * | 12/1983 | Claar | C09K 5/063 428/404 |
| 4,686,242 | A | 8/1987 | Turner | |
| 5,169,607 | A | 12/1992 | Krambrock | |
| 8,420,032 | B1 | 4/2013 | Ermanoski | |
| 2002/0143075 | A1 | 10/2002 | Agee | |
| 2013/0257056 | A1 * | 10/2013 | Ma | F28D 20/0056 126/714 |
| 2015/0190796 | A1 * | 7/2015 | Bedel | B01J 37/348 241/3 |
| 2016/0037586 | A1 | 2/2016 | Armstrong | |
| 2016/0123009 | A1 | 5/2016 | Ayambem | |

OTHER PUBLICATIONS

Harikrishnan et al. Preparation and thermal energy storage behaviour of stearic acid-TiO2 nanofluids as a phase change material for solar heating systems. Thermochimica Acta 565 (2013) 137-145. (Year: 2013).*

Machine translation of FR-2138504-A2 (Jan. 5, 1973). Retrieved from EPO Espacenet on May 12, 2025. (Year: 2025).*

Partial Search Report and Written Opinion dated Oct. 20, 2021, PCT/US2021/044864 filed on Aug. 8, 2021.

International Search Report and Written Opinion dated Jan. 6, 2022, PCT/US2021/044864 filed on Aug. 8, 2021.

Lone, et al. "Facile and highly efficient microencapsulation of a phase change material using tubular microfluidics." Colloids and Surfaces A: Physicochemical and Engineering Aspects 422 (Apr. 5, 2013): 61-67.

Wei, et al. "Novel core/void/shell composite phase change materials for high temperature thermal energy storage." Chemical Engineering Journal 391 (Jul. 1, 2020): 123539.

Liu, et al. "Determination of thermo-physical properties and stability testing of high-temperature phase-change materials for CSP applications." Solar Energy Materials and Solar Cells 139 (Aug. 1, 2015): 81-87.

Jamekhorshid, et al. "A review of microencapsulation methods of phase change materials (PCMs) as a thermal energy storage (TES) medium." Renewable and Sustainable Energy Review 31 (Mar. 1, 2014): 531-542.

International Preliminary Report on Patentability dated Feb. 16, 2023, PCT/US2021/044864 filed on Aug. 8, 2021.

Rule 161/162 Communication dated Mar. 15, 2023, European Application No. 21854187.8 filed Feb. 8, 2023.

Extended European Search Report dated Sep. 13, 2024, European Application No. 21854187.8 filed Feb. 8, 2023.

Rules 70(2) and 70a(2) EPC Communication dated Oct. 10, 2024, European Application No. 21854187.8 filed Feb. 8, 2023.

* cited by examiner

Reactor

Removed from reactor

Sieving

Carbon removed via sieving

Attrition

Balls after attrition

MOVING BED REACTOR FOR HYDROCARBON PYROLYSIS

CROSS-REFERENCE TO RELATED APPLICATIONS

This application is a filing under 35 U.S.C. 371 as the National Stage of International Application No. PCT/US2021/044864, filed on Aug. 6, 2021, entitled, "MOVING BED REACTOR FOR HYDROCARBON PYROLYSIS," which claims the benefit of and claims priority to U.S. Provisional Application No. 63/062,038 filed on Aug. 6, 2020 and entitled, "MOVING BED REACTOR FOR HYDROCARBON PYROLYSIS," both of which are incorporated herein by reference in their entirety for all purposes.

STATEMENT REGARDING GOVERNMENTALLY SPONSORED RESEARCH OR DEVELOPMENT

None.

BACKGROUND

Industrial hydrogen is produced primarily using the steam methane reforming (SMR) process, and the product effluent from the reactors contains not only the desired hydrogen product but also other gaseous species including gaseous carbon oxides ($CO/CO_2$) and unconverted methane. Separation of the hydrogen for shipment or storage and separation of the methane for recirculation back to the reformer is carried out in a pressure swing adsorption (PSA) unit, a costly and energy-intensive separation. Overall the process produces significant carbon dioxide that are released to the environment.

SUMMARY

In some embodiments, a heat transfer media comprises a particle. The particle comprises a discontinuous phase and a matrix material. The discontinuous phase is disposed within the matrix material, and the matrix material has a higher melting point than the discontinuous phase. The discontinuous phase has a melting point selected to be within a reaction temperature range.

In some embodiments, a method of conducting a reaction with a heat transfer media comprises heating a heat transfer media, melting the phase change material within the heat transfer media in response to heating the heat transfer media, contacting a reactant with the heat transfer media to form one or more products, and solidifying at least a portion of the phase change material during the contacting. The heat transfer media can comprise a phase change material.

In some embodiments, a moving bed reactor comprises a housing, a core section disposed within the housing, a first heat transfer media disposed within the core section, an annular section disposed within the housing, a second heat transfer media disposed within the annular section, and a reactor wall. The reactor wall is disposed within the housing, and the reactor wall is disposed between and defines the core section and the annular section.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
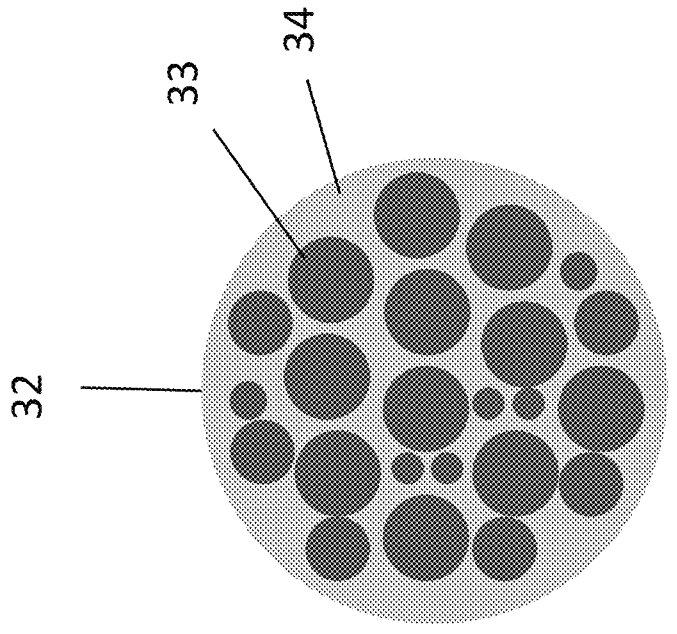
FIGS. 1A and 1B show schematic cross-sections of a heat transfer media containing a phase change material according to some embodiments.

In order to address the issues with steam methane reforming, various forms of hydrocarbon pyrolysis can be carried out in a reactor. Disclosed herein are a new heat transfer media for high temperature reactions carried out in reactors such as pyrolysis reactors. In addition, a new reactor configuration using a plurality of concentric moving beds is disclosed, which can be used for various reactions such as high temperature reactions including high temperature hydrocarbon pyrolysis reactions. While described in some aspects with regard to a pyrolysis reaction, the reactor and media configurations disclosed herein can apply to any reactor operating at high temperatures.

In some aspects, this disclosure relates to systems and materials for conducting hydrocarbon pyrolysis in a moving bed reactor. The moving bed reactor can comprise a heat transfer media having a phase change material or media, which can be referred to in some contexts as a phase change material (PCM). A heat transfer media as disclosed herein can comprise a solid matrix having a PMC enclosed as a discontinuous phase is described with the benefit of providing higher amounts of heat at a constant temperature or over a temperature range based on a phase change (e.g., from liquid to solid) of the discontinuous phase. The media can include a relatively large, non-consumable solid media for the core that allows long-term (>100 cycle) recycling and prevents aggregate formation via pebble-to-pebble bridging.

In addition, a reactor configuration is provided to allow for high temperature reactions. In some aspects, a core/annulus reactor configuration is disclosed that physically separates the hot core media from the pressure vessel boundary via an annular moving bed separated by an internal reactor wall (e.g., a solid internal barrel). Control of gas phase flow through the core and annulus through tailoring of the size distribution and void fraction of core/annulus media to have a relatively high pressure drop within the annulus and low pressure drop within the core to direct gas flow without mechanical mechanisms. Within the reactor, control of gas phase flow can be accomplished using one or more constrictions or other means of gas flow reduction in the annular media bypass to reduce unwanted reactant hydrocarbon transport through the annular zone without passing through the reactor zone. This can include passive control of gas flow without the need for active or moving valves.

In some aspects, the configurations disclosed herein can include the use of a shielding gas over the solid media heating elements to mitigate carbon deposition on the heating element surface.

Also disclosed are methods for carrying out non-oxidative dehydrogenation of hydrocarbons to produce solid carbon and hydrogen gas, which can in some aspects use any of the reactor configurations disclosed herein. The methods have been developed to use a moving bed for heat transfer to the reactant gas and deposition of the solid carbon. A key technical challenge with these systems is the containment and transport of large volumes of high-temperature heat transfer media. The use of a core/annulus configuration as disclosed herein allows for isolation of the hot solid media from the pressure vessel boundaries. In some aspects, the use of a phase change material (PCM) in the heat transfer media significantly reduces the volumes of materials that need to be transported. Further elements address other technical challenges with the practical implementation of a moving bed hydrocarbon pyrolysis reactor system.

Within high temperature reactors, contact between a heater surface and reactant containing carbon can result in the formation of carbon deposits (e.g., coke) on the heater surface. Thus, direct contact of reactants with the heater can create operational issues within the reactor. In order to avoid the coking issues, a heat transfer media can be used to transport heat from the heater element into a reaction zone. The heater element can then avoid direct contact with reactants comprising carbon to avoid the formation of coke. For high temperature reactions, there is a practical limit on the amount of heat that can be transported by a heat transfer media such a solid material. Higher reaction rates may then require a higher transportation rate through the reactor, for example, in a moving bed configuration.

Further, the purpose of the solid media in a moving bed hydrocarbon pyrolysis reactor is to transfer heat from a given heat source to the reactant hydrocarbon gas stream while avoiding coking (e.g., carbon build-up) on a static solid heat transfer surface. Given the large endotherm for most hydrocarbon pyrolysis reactions and high temperatures required to achieve sufficient single-pass yield of product hydrogen, a large quantity of high-temperature heat is required. Material and engineering constraints practically limit the temperature with which a material can be economically heated and transported in a closed-system reactor environment resulting in only small quantities of heat being transferred to reactant gas during a given media pass through the reactor.

In order to address these issues, a heat transfer media containing a phase change material (PCM) is described herein. The use of a solid media containing a phase change material allows for large quantities of high-temperature heat to be stored in the heat transfer media, transferred into the reaction zone, and released in the reactor while maintaining a maximum media temperature below engineering design constraints. The selection of the PCM material can be used to control the temperature or temperature range over which the material can solidify and release heat. This allows the specific temperatures within the reaction zone to be selected based on the reactor design.

The heat transfer media can also be used for thermal energy storage to shift the temporal profiles for the heat input to the media and the heat consumption in the reactor. The heat transfer media can be directly fed into the reactor to transfer heat to the reacting gas or serve as an intermediate heat transfer media, as described in more detail herein. When serving as an intermediate heat transfer media, the primary heat transfer media could be solid, liquid, or gas.

Figure 1B:
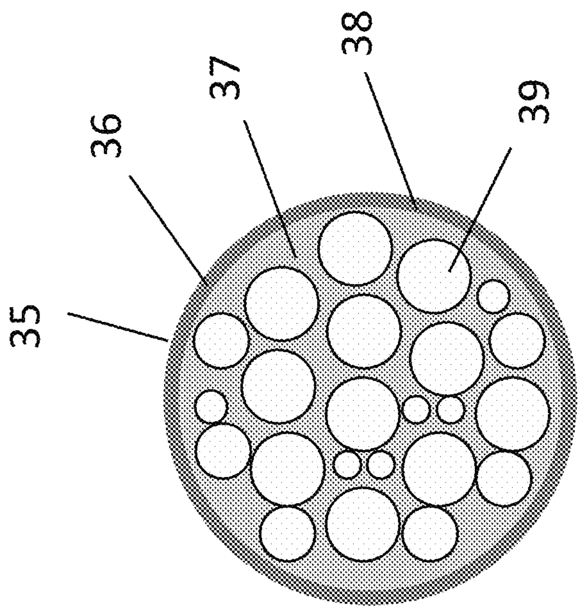

FIGS. 1A and 1B illustrate an embodiment of a heat transfer media 32 having a PCM 33. As shown in FIG. 1A, a heat transfer media 32 can have a matrix material 34 that forms a continuous phase. A PCM 33 can form a discontinuous phase within the heat transfer media 32. The PCM can be in the form of particles or pieces of PCM disposed within the matrix material 34. The PCM can be present as different sized elements, and the different particles can have the same or different compositions. For example, difference compositions can be used to provide a temperature range over which heat is released from the heat transfer media 32.

FIG. 1B shows a similar heat transfer media 35 to FIG. 1A except that the PCM 39 has a material shell 38 around the PCM 39 within the matrix material 37. The material shell can comprise a relatively hard material arranged to retain the PCM material in a liquid form within the heat transfer media 35. In addition, an additional outer shell 36 can be present around the matrix material 37. The outer shell 36 can comprise a material that can retain its physical properties at the reaction temperatures to help to avoid degradation of the heat transfer media 35 as the heat transfer media 35 moves or circulates within a moving bed reactor. The outer shell 36 can comprise any suitable high temperature material. In some aspects the outer shell 36 and/or the material shell 38 can comprise carbon, silicon carbide, silica, and/or alumina.

In some aspects, the PCM material in any configuration of the heat transfer media can have a melting point in the range of 500-1500° C. to release latent heat at a temperature sufficient for the hydrocarbon pyrolysis reaction to occur. In some aspects, suitable phase change material(s) can include metals or alloys including but not limited to the following elements: Fe, Al, Si, B, Mn, Cu, alloys thereof, or combinations thereof. The materials can be selected to provide a desired melting point or melting point range useful with the reaction. In some aspects, the phase change material can be a multi-element system of interest including Fe—Si—B, Fe—Si, Al—Si, Mn—Si, or combinations thereof. In some aspects, suitable matrix material(s) can include carbon and/or oxides, nitrides, or carbides including but not limited to the following elements: B, Si, Al, Ti, or combinations thereof.

As shown in FIGS. 1A and 1B, a plurality of PCM zones or particles can be present in the heat transfer media. The composition of each particle of PCM material within the heat transfer media can be the same or different. The use of different materials can provide for different melting points or melting ranges. In some aspects, the heat transfer media can comprise particles having a PCM with one or more compositions, and a second or different particle can have a PCM with one or more compositions. This can allow for the use of PCM materials with different melting points or melting point ranges to release heat across a desired temperature range using a mixture of PCMs in different particles. In some aspects, the phase change material can include metal oxides. In some aspects, the phase change material can include salts.

In use, the heat transfer media can be heated to a desired temperature, where the final temperature is above the melting point of the PCM within the heat transfer media. During heating, any PCM can then melt and form a liquid phase, thereby storing heat. The resulting liquid phase can be retained within the heat transfer media based on the matrix phase and/or shells enclosing the liquid phase. When used in a reaction zone, the heat transfer media can release sensible heat until the melting point is reached. At the melting point or over a melting point range, the PCM can solidify to release latent heat. Once the PCM is entirely solidified, the heat transfer media can again release sensible heat until the heat transfer media exits the reactor or the temperature falls below a temperature at which the reaction can occur.

Figure 2B:
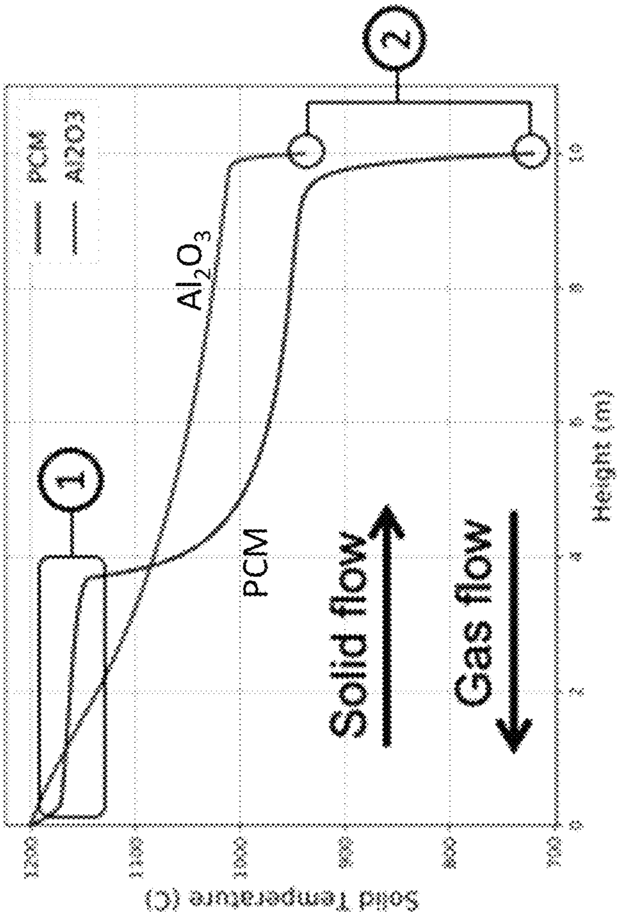
FIG. 2B illustrates an exemplary plot of the solid media temperature versus reactor height for a counter-current moving bed reactor with solid media containing a phase change material (PCM) and a media that delivers only sensible heat ($Al_2O_3$).
Figure 2A:
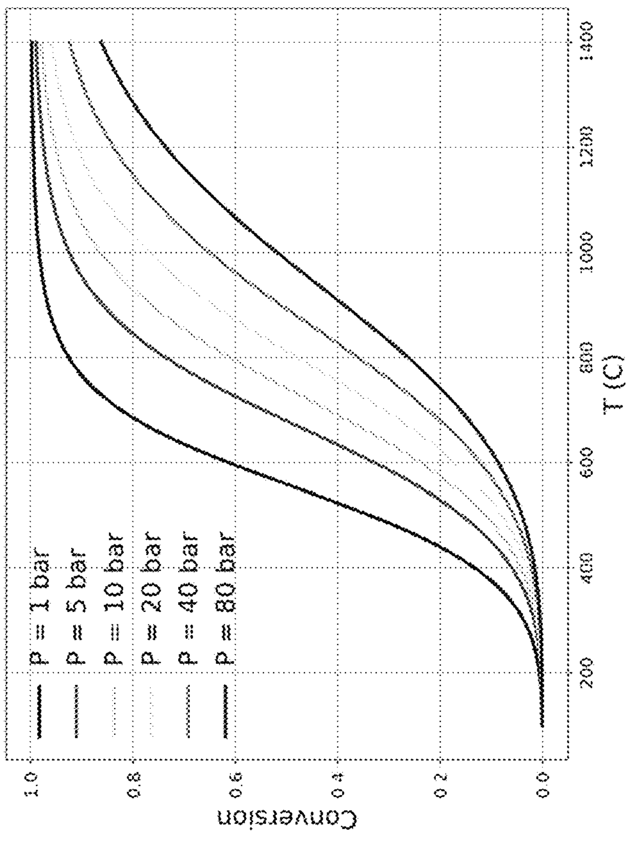
FIG. 2A illustrates an exemplary plot of equilibrium methane pyrolysis conversion versus temperature isobars, showing conversion primarily occurring the temperature range of 500-1500° C.

As shown in FIG. 2A, the reaction conversion for a hydrocarbon pyrolysis reactor is dependent on the pressure and temperature. The temperature of the melting point or melting range of the PCM can be selected based on the temperature and pressure of the reactor along with the desired conversion.

Compared to a heat transfer media that transfers only sensible heat, a PCM yields two main benefits. As shown in FIG. 2B, the PCM heat transfer media produces a relatively isothermal zone (e.g., labeled as zone 1 in FIG. 2B) where large quantities of heat can be transferred at a high temperature. Furthermore, the PCM-containing media is removed from the reactor zone at a lower temperature than sensible heat only media (e.g., as shown by the difference 2 on FIG. 2B). As a result of the inclusion of the PCM in the heat transfer media, more heat can be conveyed into a reaction zone with a lower entry temperature than would be required for a heat transfer media not having a PCM, and the outlet temperature can be lowered to enable easier handling of the heat transfer media during circulation or transport.

Also disclosed herein is a moving bed reactor having an annular section disposed concentrically around a core section. In order to achieve high single-pass hydrogen yield in hydrocarbon pyrolysis reactions, temperatures greater than or equal to about 1000° C. are typically required. Containment of solid media at high-temperature requires internal insulation or other means of reducing the temperature between the media and a metal pressure vessel boundary. By integrating the moving beds used for heat transfer to the solid media, heat transfer from the solid media to the reactant gas in the reaction zone, heat recovery from the product gas stream, and reactant gas pre-heating into a single vessel, the temperature of the solid media and gas streams at the radial and axial pressure vessel boundaries can be reduced compared to a configuration where the moving beds for these four unit processes are housed in their own vessels.

The integration of the moving beds into a single vessel also produces the benefit of reducing or eliminating pipes and conduits for transport of solid media and gas streams between the unit processes. Transport of high-temperature hydrocarbon gas streams is difficult due to the propensity for hydrocarbons to decompose and build-up carbon on metal surfaces. By reducing and/or eliminating transfer pipes and conduits, solid media and gas streams can be transferred at higher temperatures yielding gains in energy efficiency.

It should be understood that while the core/annulus configuration allows for complete encapsulation of the moving bed along the boundary transverse to solid media flow, configurations that allow for only partial encapsulation provide similar benefits. For instance, having the two beds contained within the same vessel but separated by a vertical divider would still allow for reducing or eliminating pipes and conduits for transport of solid media and gas streams between the unit processes.

One of the challenges with integrating the moving beds for the four unit processes is directing the reactant gas stream from the gas pre-heater zone (within the annular section) to the reaction zone (core section) and back to the gas heat recovery zone (annular section) without the use of mechanical devices, which are generally not well suited for very high-temperature operation. The design disclosed herein can use different size media and physical structures to increase the resistance to gas flow in the annulus media bypass zone (e.g., the annular section). The Ergun equation, shown below, is used to calculate the gas pressure drop in a column of packed media:

$$\Delta P = \frac{150\mu L}{D_p}\frac{(1-\epsilon)^2}{\epsilon^3}v_s + \frac{1.75L\rho}{D_p}\frac{(1-\epsilon)}{\epsilon^3}v_s|v_s|$$

Where ΔP is pressure drop, μ is dynamic viscosity, ∈ is void fraction (porosity), $v_s$ is superficial gas velocity, ρ is gas density, $D_p$ is the equivalent spherical diameter of the packing, and L is the length of the bed. The superficial gas velocity is defined as:

$$v_s \equiv \frac{\dot{V}}{A}$$

Where $\dot{V}$ is the gas volumetric flowrate and A is the column cross-sectional area. Assuming the pressure drop for gas transfer from the core to the annulus is negligible, the pressure drop across the core and the annulus will be the same. Combining the Ergun equation with the definition of the superficial gas velocity and rearranging to solve for the volumetric gas flowrate yields:

$$\dot{V} = \frac{2A}{7L\rho}\left(-150(1-\epsilon)L\mu + \sqrt{150^2\mu^2L^2(1-\epsilon)^2 + 7\Delta PD_pL\rho\frac{\epsilon^3}{(1-\epsilon)}}\right)$$

For a given set of flow parameters in the geometry and flow regime of interest, the gas volumetric flowrate is directly proportional to A, directly proportional to $D_p$, and inversely proportional E. The annulus moving bed design variables A, $D_p$, and ∈ can thus be tailored to reduce the gas volumetric flowrate in the annulus relative to the core. Furthermore, static structural features can be integrated into the annulus to further restrict gas flow.

Overall, the combination of tailoring the heat transfer media size, the heat transfer media size distribution, the annular cross-sectional area, and the flow restriction features allows for directing >90% of the gas flow through the reaction zone within the core section without the use of mechanical devices (e.g. values, nozzles, orifices, etc.).

Another challenge with heating the solid media is the prevention of carbon deposition on the surfaces of any heating elements. While the solid media can be heated in another vessel and transferred into the reactor, this type of process requires the transport of very high-temperature solid media. To overcome this challenge, the heat transfer media can be heated within the reactor as described herein. However, this design can then allow a portion of the reactant gases to contact the heating element, potentially forming coke on the heating elements. As part of the process, a blanket gas such as an inert shielding gas or a portion of a recycled hydrogen gas product can be used to prevent hydrocarbon flow into the solid media heater zone. The shielding gas can be any gas including, but not limited to, the following species: $H_2$, $CO_2$, CO, $N_2$, $H_2O$, and Ar. The shielding gas can be independently supplied or comprise a partial recirculation of the product gases before or after any separation steps.

In use, the shielding gas can by injected into the reactor in a way to allow the shielding gas to pass over the heating element prior to passing out of the reaction zone. The pressure and flowrate of the shielding gas can be selected and controlled to reduce or eliminate contact between any reactant gases containing carbon and the heating element. This can help to prevent carbon deposits on the heating element itself. The shielding gas can then pass out of the reactor with the product gas. When an inert gas is used, the inert gas can be separated from the products and reused or removed from the system. When a recycled product gas is used (e.g., hydrogen), the hydrogen can be processed with the product gases.

Two challenges with hydrocarbon pyrolysis in a moving bed include the prevention of solid heat transfer media aggregation in the reactor zone via particle-to-particle bridging and separation of the solid carbon product from the bed heat transfer media. Aggregation of solid heat transfer media tends to increase as the particle size decreases due to the reduced binding strength needed to firmly join two particles. By utilizing a large (e.g., >1 cm diameter, >2 cm diameter, etc.) solid heat transfer media particle size, the required binding strength to permanently adhere two particles is significantly increased.

In some cases, the heat transfer media can be consumed in the process and disposed of with the carbon. This can incur significant operating expenses. The use of a large solid media has the additional benefit that deposited carbon can be removed by aggressive means on an individual particle/pebble basis such as via chiseling, grinding, grating, or other methods of physically removing solid carbon from the surface. In some aspects, the solid heat transfer media can have a diameter between about 0.01-10 inches, or between about 0.25-8 inches. In some aspects, the solid media can have a diameter of greater than 1 cm, greater than 2 cm, or greater than 3 cm. In some aspects, the solid media can comprise a plurality of sizes to achieve a packing factor, and the solid media in the annulus can have a different size than the solid media in the core section.

Figure 3:
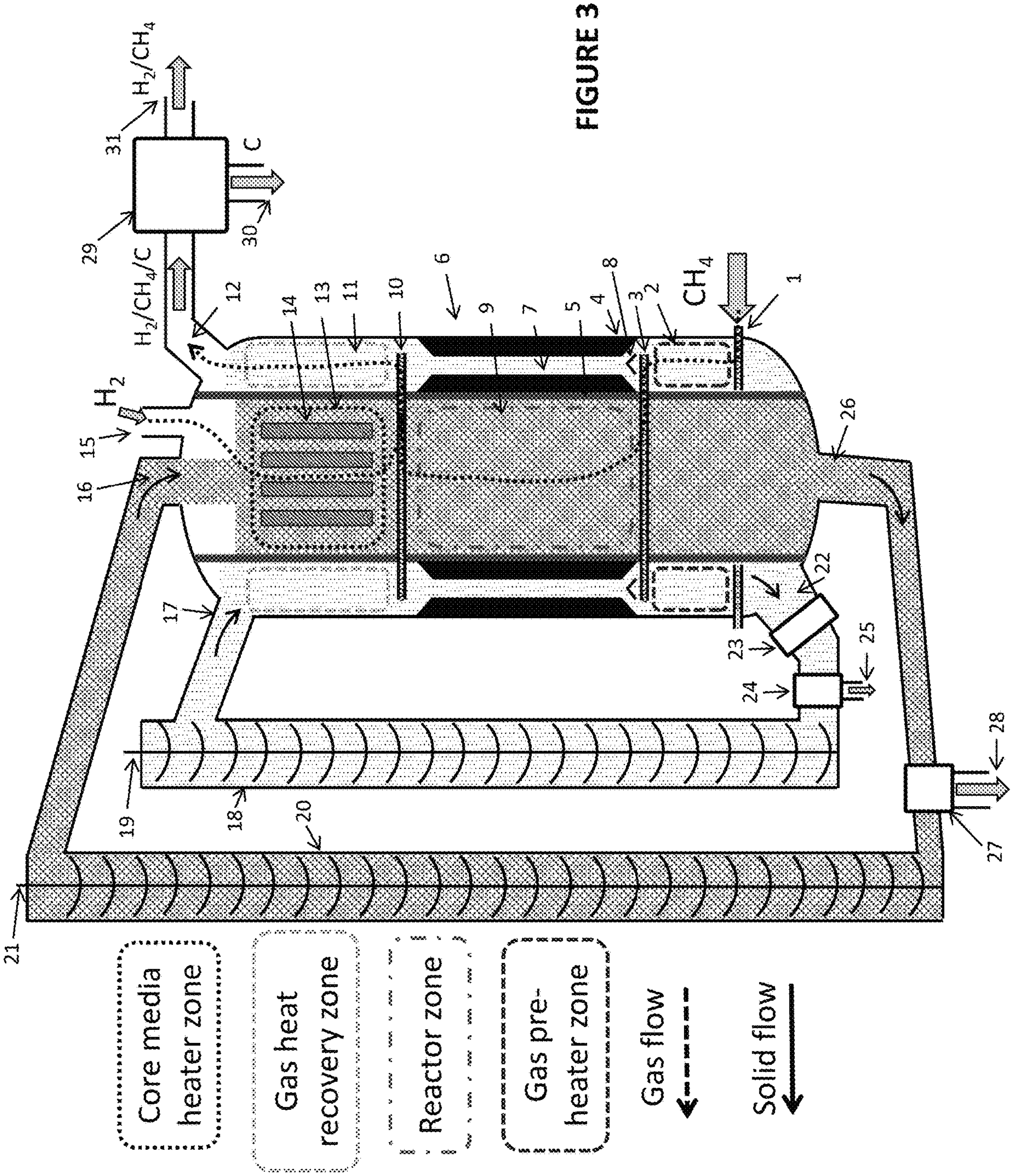
FIG. 3 shows a schematic illustration of a reactor according to some embodiments.

FIG. 3 illustrates a schematic illustration of a moving bed reactor in which a hydrocarbon gas 1 is introduced via a distributor in the bottom of the moving bed in the annular section. The hydrocarbon gas 1 can be introduced at a temperature between about 0-700° C. The hydrocarbon gas 1 can be pre-heated in the lower gas-preheater zone 2 based on heat transfer between the moving bed in the core section and the moving bed in the annular section. The hydrocarbon gas can be heated to a temperature between 400-900° C.

The heated reactant gas can then be passed or transferred to the core bed in the core section through a manifold 3. All of the heat transfer media and gas streams can be contained within a single pressure vessel or housing 4. The core and annulus moving beds can be separated via a reactor wall (sometimes called a core barrel or solid separator) 5. The solid heat transfer media in the annular section can be supplied to the gas-preheater zone from the gas heat recovery zone 2 via an annular heat transfer media bypass 6.

Reactant gas flow can be directed through the reaction zone using one or more pressure restrictions in the annular section. For example, flow constrictors 7 and static solid gas flow restrictors 8 can be used to limit gas flow through the annulus media bypass. The flow constrictors 7 can represent areas of reduced cross-sectional flow area within the annular section. As noted above, gas volumetric flowrate is directly proportional to column cross-sectional area. Therefore, the reduced cross-sectional flow area has the effect of reducing the gas volumetric flowrate through the annular bed. Similarly, the gas flow restrictors 8 serve to increase the gas flow resistance through the annular section while still allowing the heat transfer media in the annular section to move as a moving bed. In addition, the selection of the properties of the heat transfer media in the annular zone can be used to further increase the pressure drop or resistance to flow through the annular section, thereby directing the reactant stream through the reaction zone in the core section. For example, the heat transfer media in the annular section may have a smaller particle size than the heat transfer media in the core section.

Hydrocarbon gas can be pyrolyzed in the reactor zone 9 based on contact with the heat transfer media in the core section at temperatures and pressures suitable for pyrolyzing the hydrocarbons to form hydrogen and solid carbon. The product gas along with any unreacted hydrocarbon gas can be passed or transferred back to the annulus bed in the annular section via another conduit manifold 10. The products can pass back to the annular section at a temperature between about 800-1300° C. The hot product gas can be cooled in the upper annular moving bed 11 based on contacting recycled heat transfer media from the lower portion of the annular section before exiting the vessel 12 at a temperature between 0-700° C. The solid carbon product can deposit on the core heat transfer media, the annular heat transfer media, or remain entrained in the product gas stream.

The core heat transfer media can be heated in the core media heater zone 13 via heating elements 14 to a temperature between about 800-1300° C., or between about 500-1500° C. The heat transfer media in the core section can include any heat transfer media, including any of the heat transfer media comprising a PCM as described herein. An inert shield gas can be supplied to the top of the core section via a gas inlet 15. Solid media can be supplied to the core section via a solid media inlet 16 at a temperature between 400-900° C. Solid media can be supplied to the annular section via a solid media inlet 17 at a temperature between 0-700° C. The annular heat transfer media can be recirculated via a heat transfer media conveyor such as an elevator 18. The heat transfer media can be conveyed mechanically and/or pneumatically. In this embodiment, a screw auger 19 can be used to lift the annular heat transfer media. The core heat transfer media can similarly be recirculated via a conveyor or elevator 20. The core heat transfer media can be conveyed mechanically and/or pneumatically. In this embodiment, a screw auger 21 can be used to lift the core heat transfer media. The annular heat transfer media can exit the annular section 22 at a temperature between 0-700° C. and passes through a heat exchanger 23. The heat exchanger 23 can reduce the media temperature to between 0-700° C. The media leaving the heat exchanger can be fed to a carbon separator 24 where the solid carbon can be removed as a solid carbon stream 25, and the solid annular heat transfer media can be recycled. The core heat transfer media can exit the core section 26 at a temperature between 400-900° C. and enters a carbon separator 27. Solid carbon can be removed from the heat transfer media as stream 28 and the solid heat transfer media can be recycled. The product gas stream leaving the reactor via the product gas outlet 12 can enter a carbon separator 29 such as a cyclone, bag filter, and/or electrostatic precipitator. A carbon product stream 30 can be removed, and the remaining gas stream can be produced as gas stream 31. In some aspects, the gas stream 31 can be cleaned of solid particulates, and in some aspects, the gas stream 31 may comprise substantially pure hydrogen, depending on the extent of reaction in the reactor zone and the selection of the shield gas.

Figure 4:
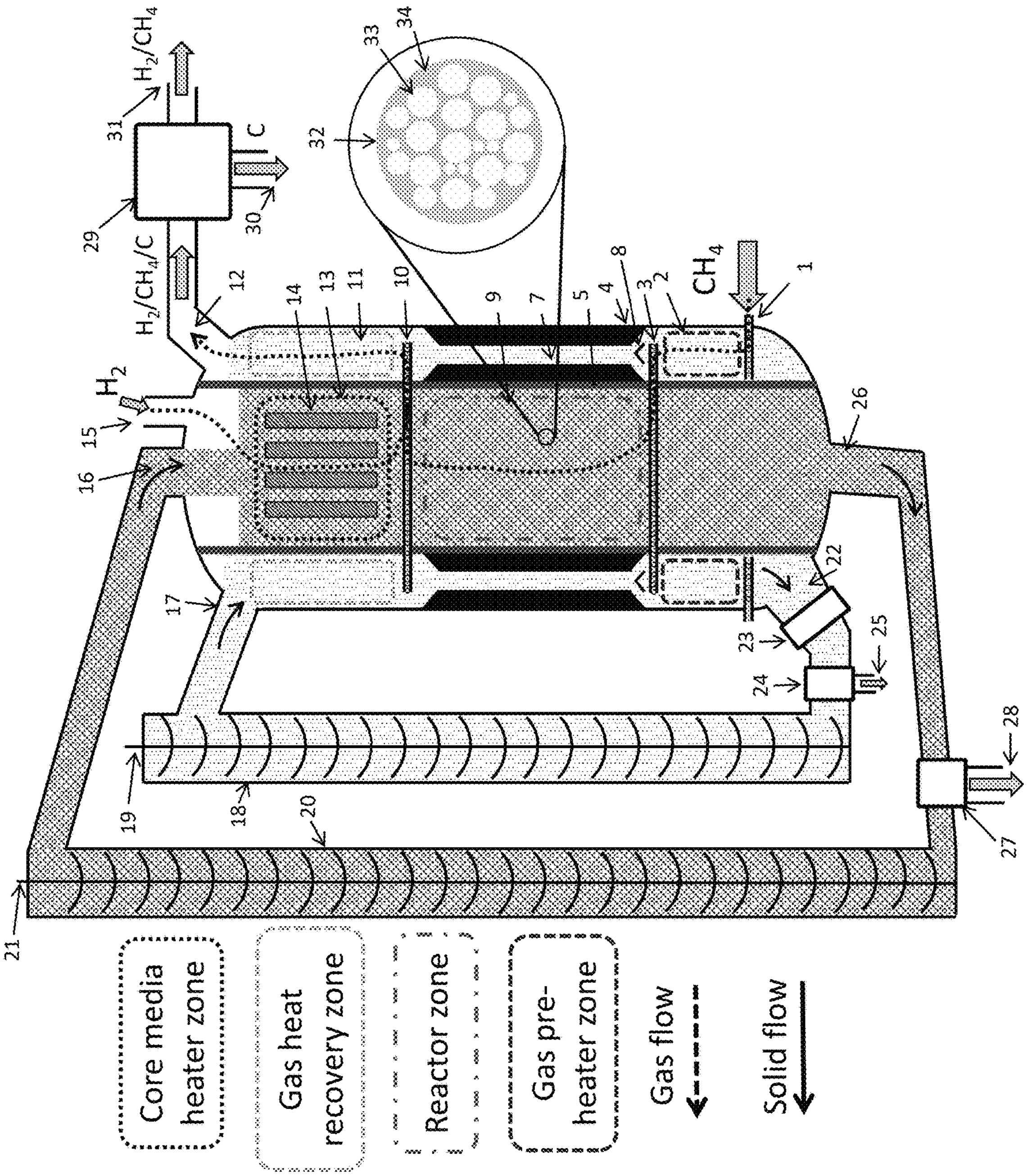
FIG. 4 shows another schematic illustration of a reactor according to some embodiments.

FIG. 4 is generally the same as FIG. 3 with the addition of a zoomed in view of the core media containing a phase change material (PCM). The heat transfer media 32 that can be in the form of a core media pebble contains a PMC 33 in or about a solid matrix 34. In some aspects, the heat transfer media in the core section and/or the annular section can comprise a heat transfer media containing a PCM as described herein. In some aspects, the temperature profiles of the heat transfer media in the annular section may be lower than those in the core section, and the selection of materials used as a PCM may vary between the heat transfer media. The use of a lower temperature in the annular section may reduce the amount of coking of any product passing through the annular bed.

Figure 5:
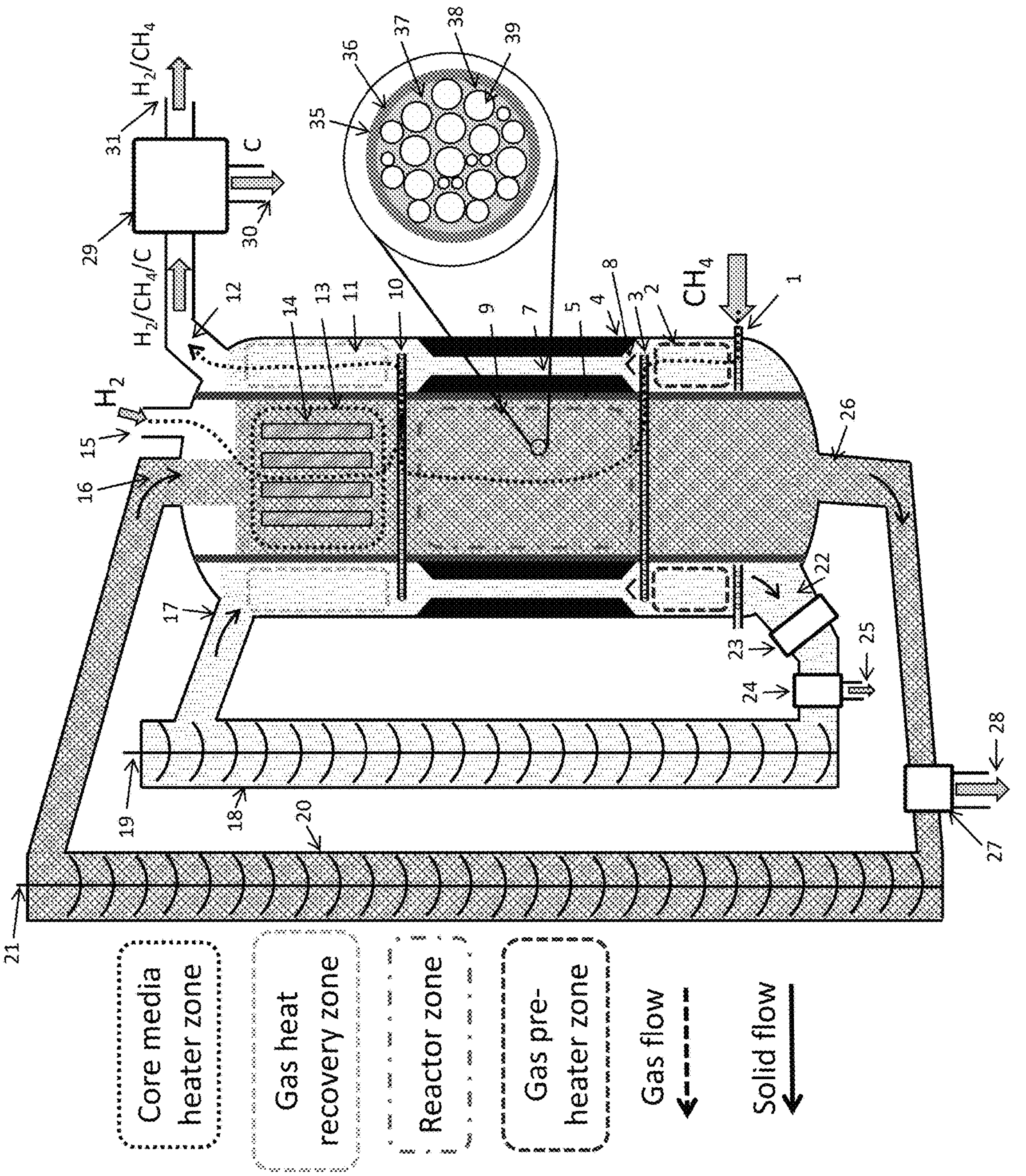
FIG. 5 shows yet another schematic illustration of a reactor according to some embodiments.

FIG. 5 is also the same as FIG. 3 with the addition of a zoomed in view of the core media containing a phase change material showing one detailed embodiment of the core media containing a PCM. The core media pebble 35 can have a hard, durable shell 36 that is composed of a material including but not limited to carbon, silicon carbide, silica, or alumina. A solid matrix 37 contained within the shell surrounds one or several encapsulated PCM pellets. The encapsulated PCM pellets are composed of a PCM 39 contained within a durable coating shell 38.

Figure 6:
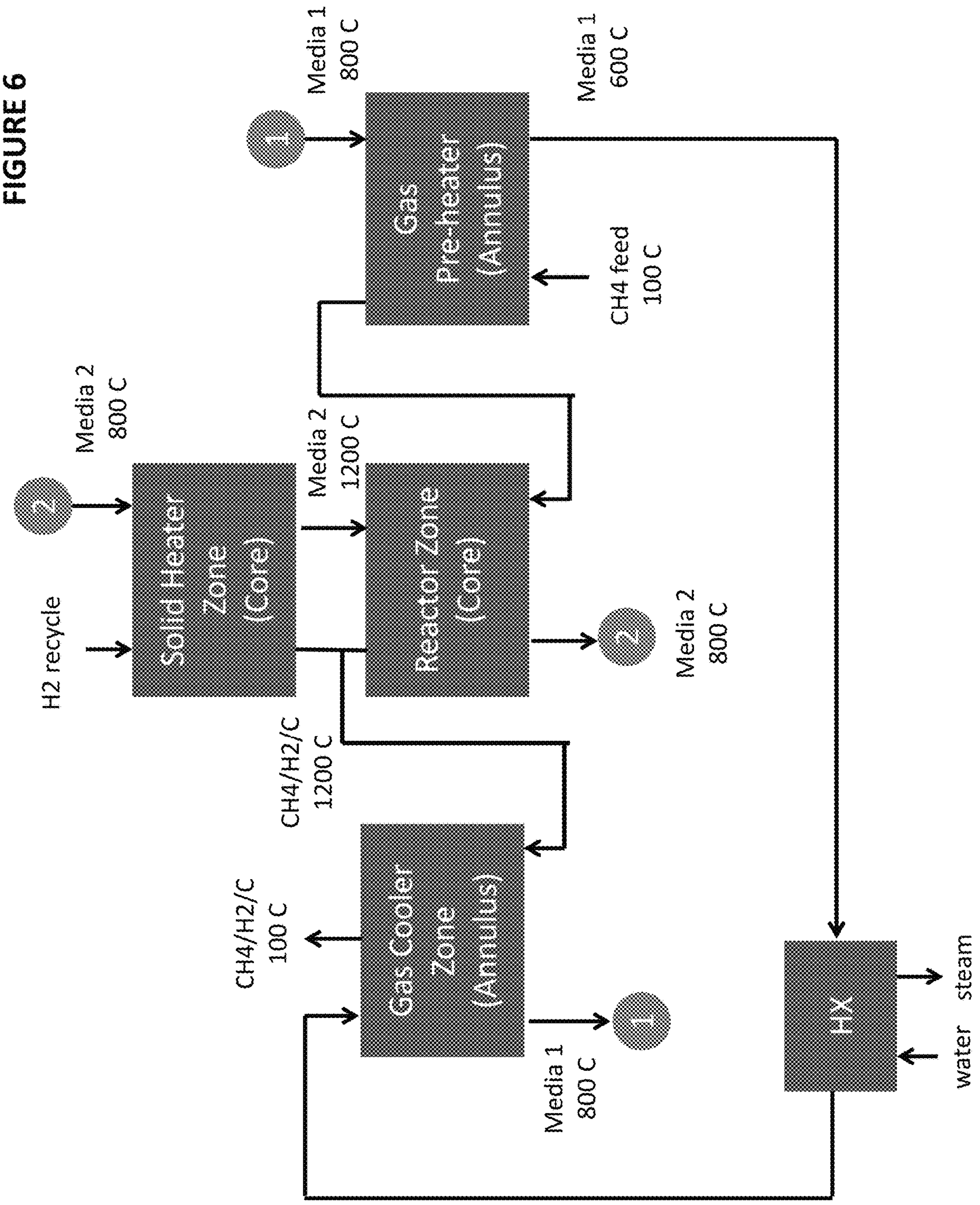
FIG. 6 shows a schematic flowsheet of the reaction processes according to some embodiments.

FIG. 6 illustrates a process flow diagram showing the various processes occurring with the moving bed reactor. As illustrated, the reactant gases (e.g., a gas comprising a hydrocarbon) can be fed to the gas pre-heat zone in the annulus. The annular heat transfer media can also be fed to the gas-preheat zone to transfer heat from the heat transfer media to the reactant gases. The pre-heated gas can then pass to the reaction zone where a second heat transfer media can be contacted with the pre-heated reactant gases to convert at least a portion of the reactant gases to hydrogen and carbon. The second media used in the reaction zone can pass to the reaction zone from a solid heater zone in which the second heat transfer media can be pre-heated prior to entering the reactor zone. A blanket gas such as hydrogen can also be fed into the solid heater zone to limit contact between the reactant gases and the second heat transfer media. The products and any unreacted reactant gases can pass out of the reactor zone and pass to a gas cooler zone in the annulus. The gases can then pass out of the reactor for removal of any solid carbon and separation of the gases.

The second heat transfer media leaving the reactor zone can be cooled before being recycled to the solid heater zone. The first heat transfer media can be present in the gas cooler zone and pass through a bypass before passing to the gas-preheater zone. A heat exchanger can be used to contact the first heat transfer media to cool the first heat transfer media in order to maintain the outer shell or reactor vessel at a desired temperature. This system allows the outer reactor vessel to be maintained at a lower temperature than the core zone.

Figure 7A:
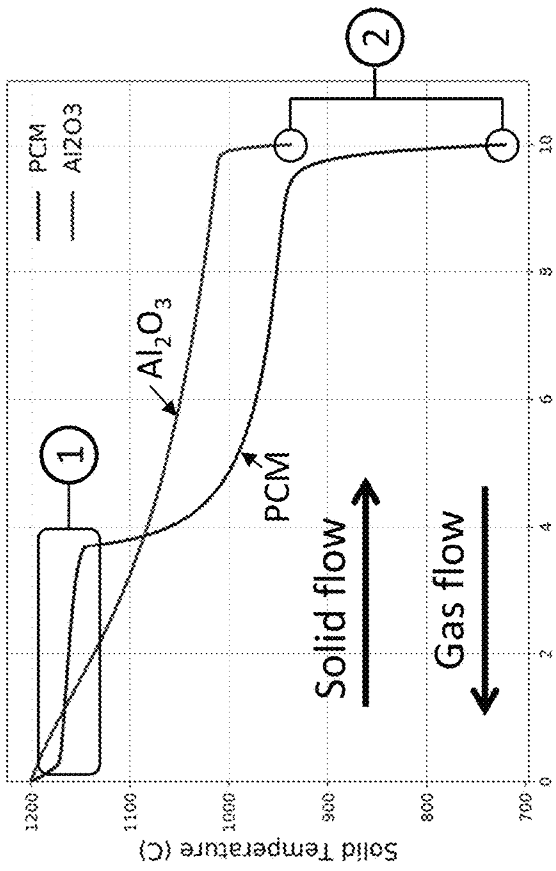
FIGS. 7A and 7B show modeled results of a reactor using a heat transfer media comprising a PCM according to some embodiments.
Figure 7B:
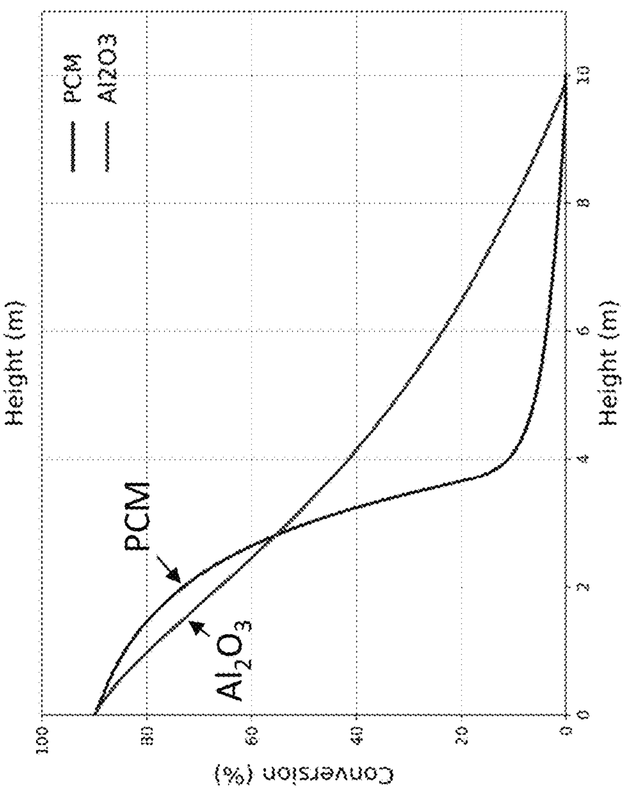

FIGS. 7A and 7B illustrate modeled results for the conditions as shown using the system as illustrated in FIG. 3. This model is based on a conversion of 90%, a pressure of 10 bar, a reaction section length of 10 m, an inlet media temperature of 1200° C., an inlet gas temperature of 600° C. and a volume-average reaction rate of 10 mol $H_2/m^{3-s}$. In this model, the core heat transfer material comprises a PCM material. As shown in FIGS. 7A and 7B, the PCM results in an isothermal region of high temperature and high reaction rate as compared to a solid heat transfer media that steadily drops in temperature. Further, the model demonstrates that the heat transfer media can be removed from the reaction zone and/or the core section at a temperature of approximately 200° C. below a comparable non-PCM heat transfer media. This has the benefit of allowing the carbon removal and heat transfer media handling to be easier and safer to operate.

Figure 8:
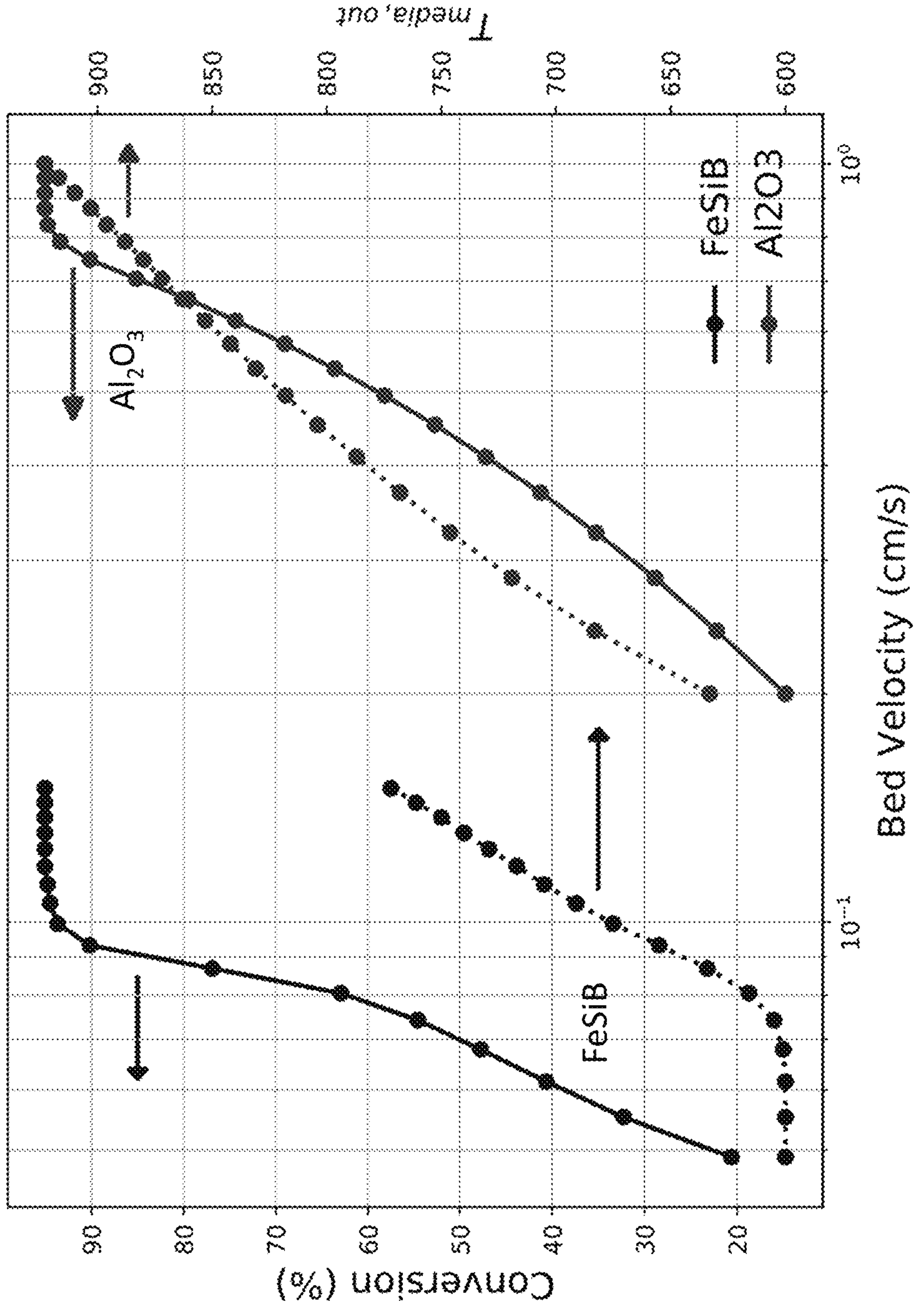
FIG. 8 shows additional modeled results of a reactor using a heat transfer media comprising a PCM according to some embodiments.

FIG. 8 illustrates the modeled results for conversion versus gas velocity in the heat transfer media bed with a 10 second gas residence time in the reaction zone. The modeled results used inputs that are otherwise the same as those described with respect to FIGS. 7A and 7B. The results further indicate that the heat transfer media can be removed from the reaction zone and/or the core section at a temperature of approximately 200-250° C. below a comparable non-PCM heat transfer media. The results as shown in FIG. 8 also demonstrate that the flow rate of the heat transfer media can be reduced by a significant amount. In some aspects, the use of a PCM in the heat transfer media can allow the heat transfer media flowrate through the reaction zone to be reduced by a factor of greater than 2, greater than 3, greater than 4, greater than 5, greater than 6, greater than 7, or about 8 relative to the flowrate for a non-PCM containing heat transfer media. The decreased flow rate of the heat transfer media through the reaction zone indicates that a greater amount of solid carbon can form on the heat transfer media. Assuming that the carbon forms on the heat transfer media at a consistent rate, the use of a PCM in the heat transfer media can allow the heat transfer media to accumulate carbon a factor of greater than 2, greater than 3, greater than 4, greater than 5, greater than 6, greater than 7, or about 8 relative to the flowrate for a non-PCM containing heat transfer media. This may help in allowing the carbon to be removed from the surface of the heat transfer media in the downstream carbon separator.

Figure 9:
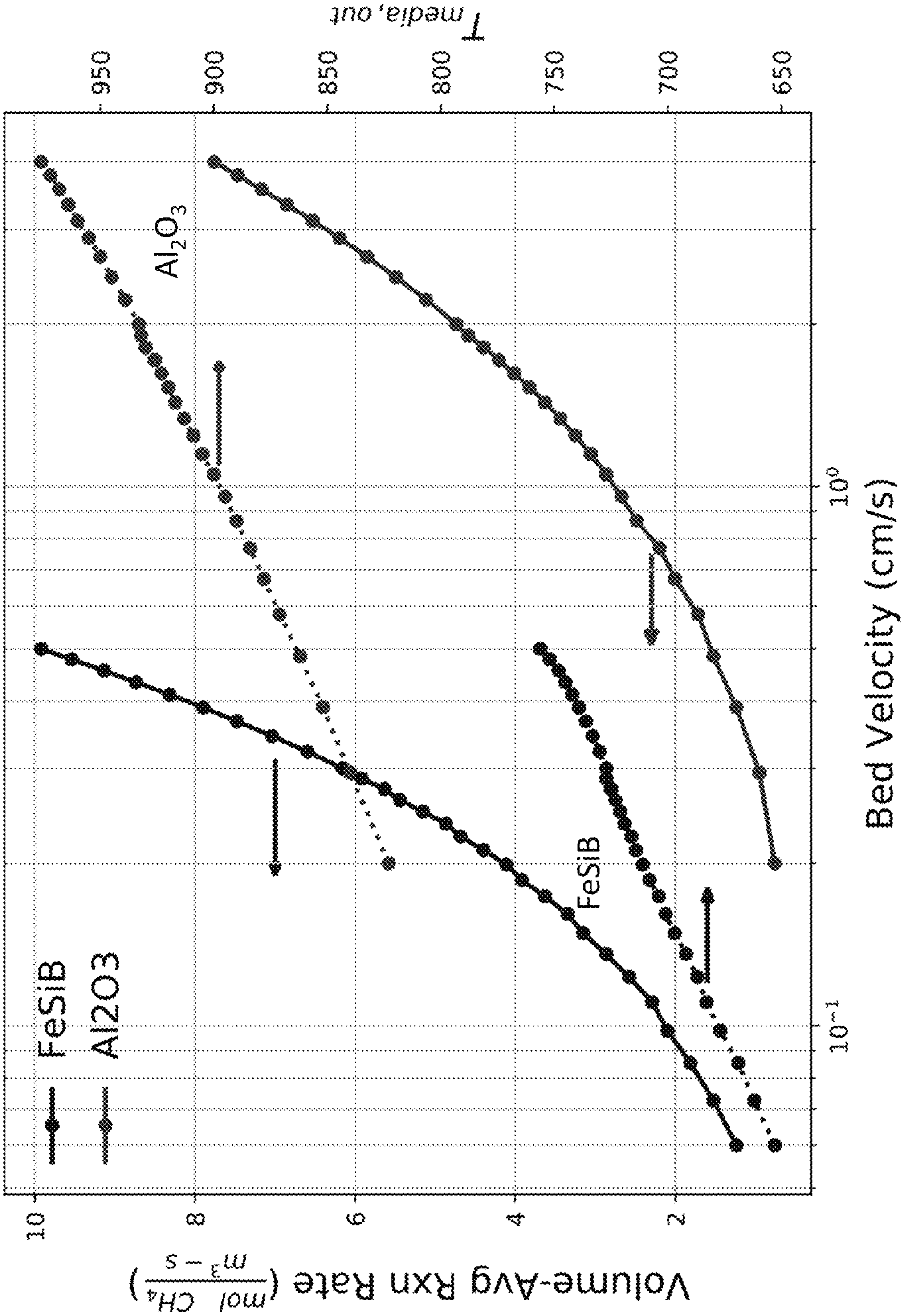
FIG. 9 shows modeled results of a reactor using a heat transfer media comprising a PCM according to some embodiments.
Figure 10:
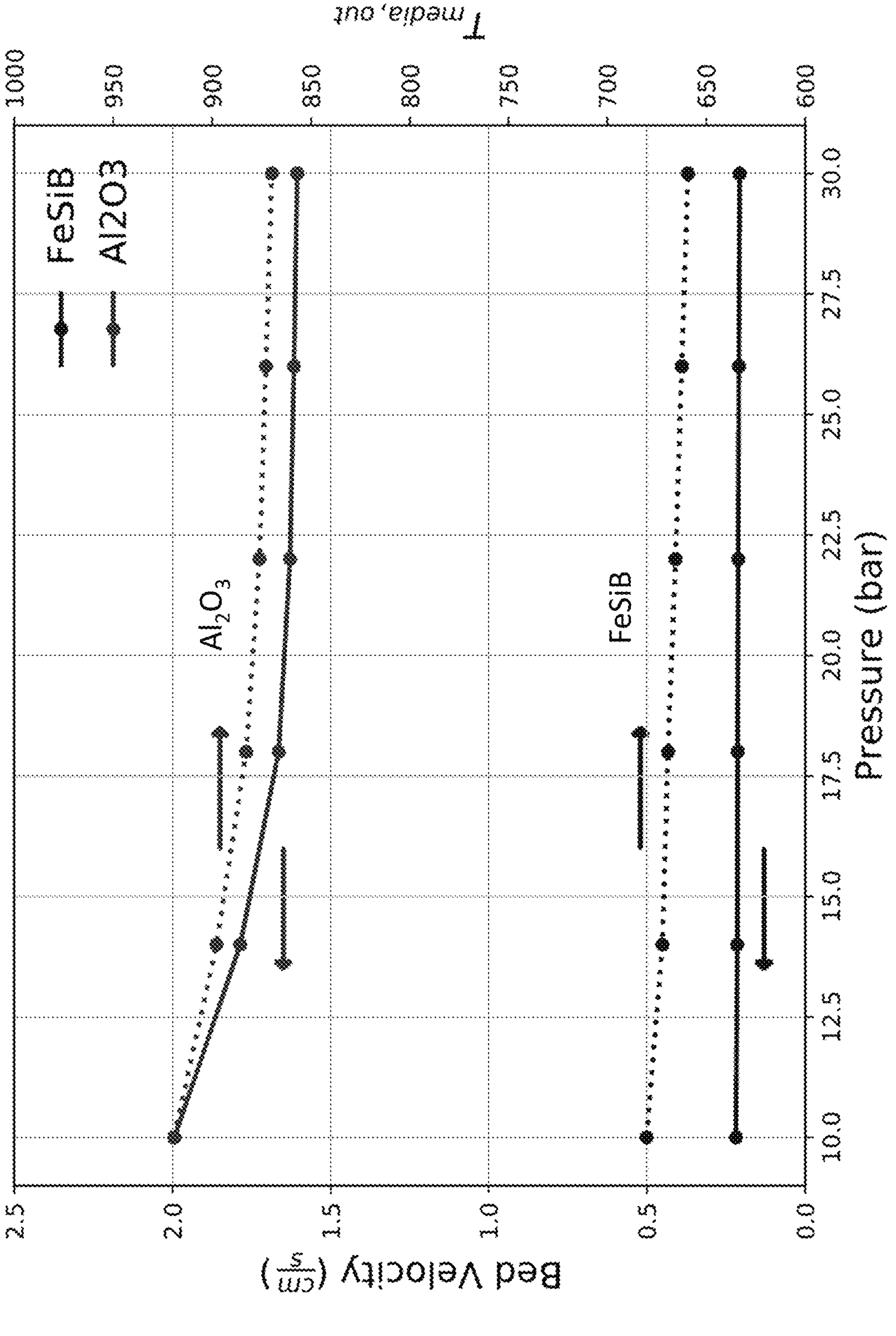
FIG. 10 shows modeled results of a reactor using a heat transfer media comprising a PCM according to some embodiments.

FIGS. 9 and 10 further demonstrate modeling results showing the reduced outlet temperatures along with a reduced mass flowrate of the heat transfer media through the reaction zone. FIG. 9 uses modeled parameters that are the same as those described with respect to FIGS. 7A and 7B. The modeled results in FIG. 9 illustrate potential reaction conditions and heat transfer media flowrates. As examples, the modeled results indicate that a target volumetric reaction rate of 5 mol $CH_4/m^{3-s}$ (10 mol $H_2/m^{3-s}$) can be met with an outlet media of 725° C. and 925° C. with PCM and $Al_2O_3$, respectively. Further, at a volumetric average reaction rate of 10 mol $H_2/m^{3-s}$, the mass flow rates of media are 0.75 kg/s/kta $H_2$ and 5.9 kg/s/kta $H_2$ for FeSiB and $Al_2O_3$, respectively.

FIG. 10 shows modeled results based on a conversion of 85%, a volume-average reaction rate of 10 mol $H_2/m^{3-s}$, a 10 meter reactor having an inlet media temperature of 1200° C. and an inlet gas temperature of 600° C. As an example, the bed velocity was found that gave an 85% conversion. As before, the solid heat transfer media flow rate decreased by a factor of 7.5-9 and the outlet solid bed temperature was ~210-240° C. lower when a PCM was used. The pressure reduced $T_{media,out}$ by 1 C/bar and 2.5 C/bar for FeSiB and $Al_2O_3$, respectively. The pressure reduced bed velocity by 0.0006 cm/s/bar and 0.019 cm/s/bar for FeSiB and $Al_2O_3$, respectively.

Figure 11:
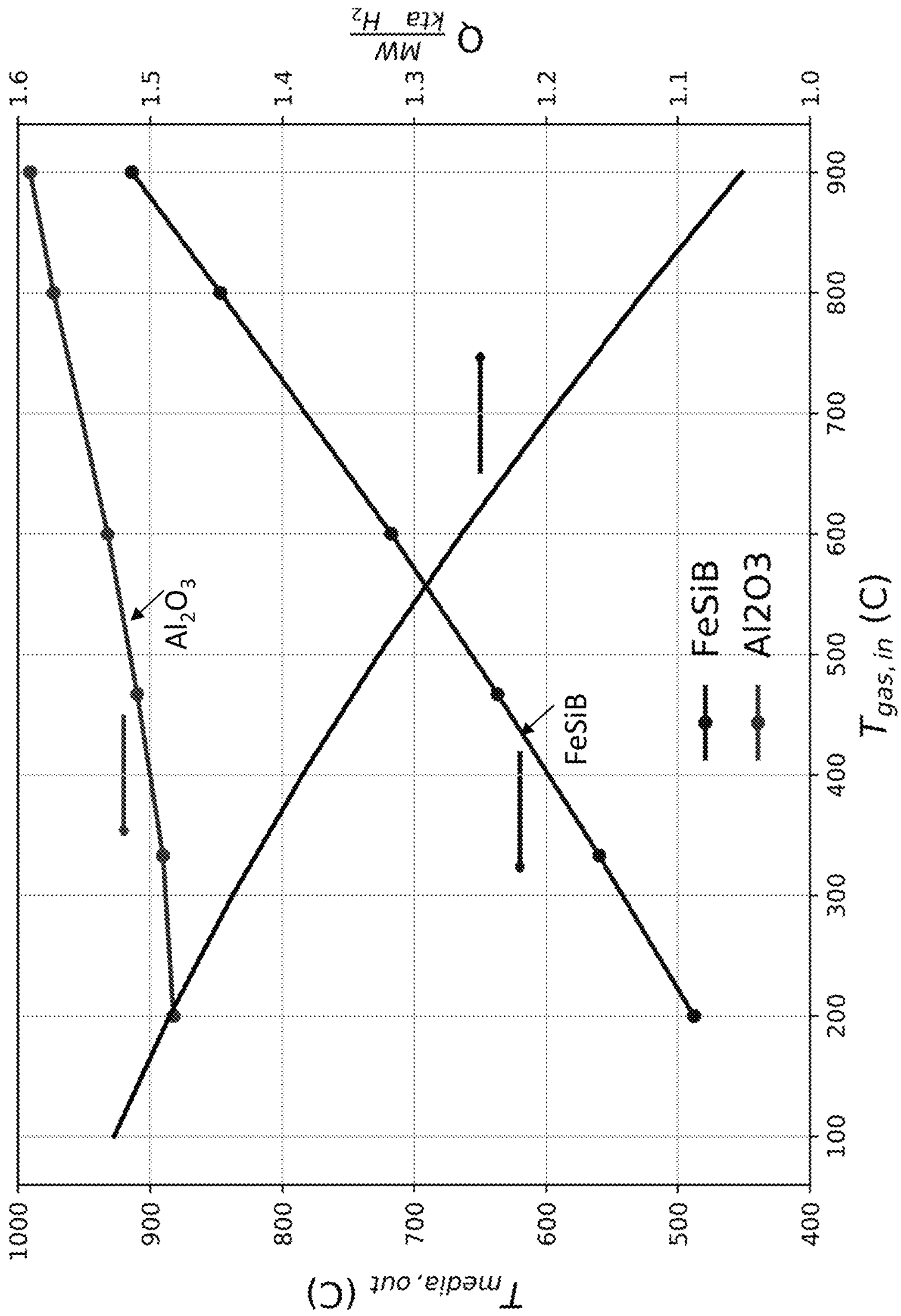
FIG. 11 shows additional modeled results of a reactor using a heat transfer media comprising a PCM according to some embodiments.

FIG. 11 demonstrates modeling results also showing the decreased outlet temperature when the heat transfer media comprising the PCM is used. FIG. 11 also indicates a reduction in the heat duty for the reactor as the inlet gas temperature is increased. The use of a feed pre-heat zone and/or feed heat exchanger can then be useful in increasing the feed temperature prior to introduction of the feed to the reaction zone in order to reduce the overall heat duty of the system. As an example, the $T_{media,out}$ is ~200-400° C. lower when a PCM is used with the heat transfer media. A 0.06 MW/kta $H_2$ reduction in reactor heat duty is achieved for every 100° C. increase in inlet gas temperature. The reactor heat duty is modeled to be approximately 1.1-1.25 MW/kta $H_2$.

Figure 12:
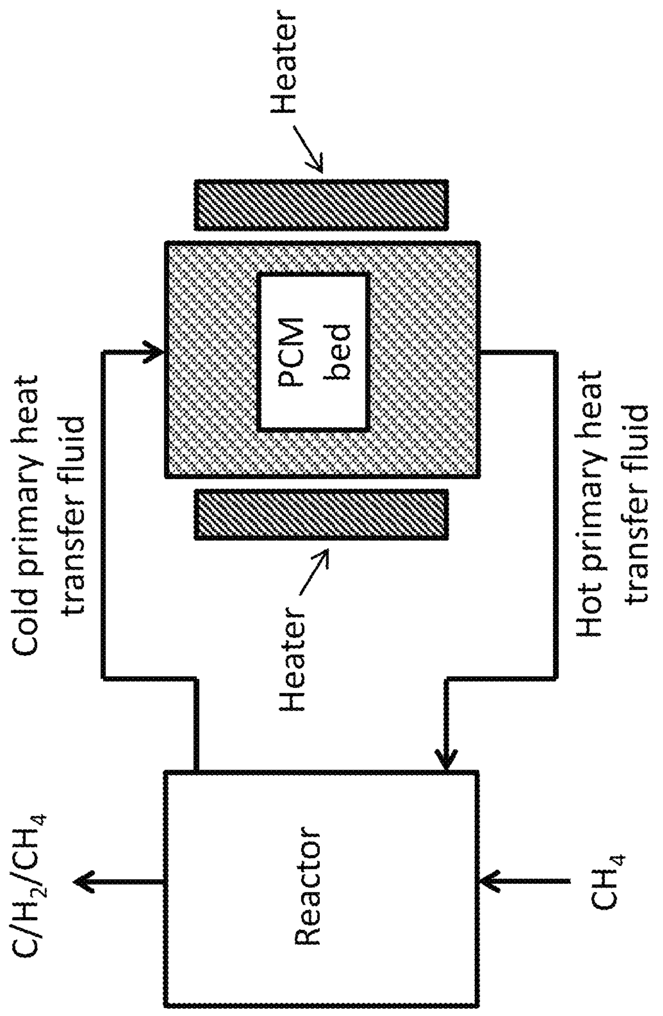
FIG. 12 shows a schematic flow sheet of a PCM used to transfer heat into a reaction system according to some embodiments.
Figure 13A:
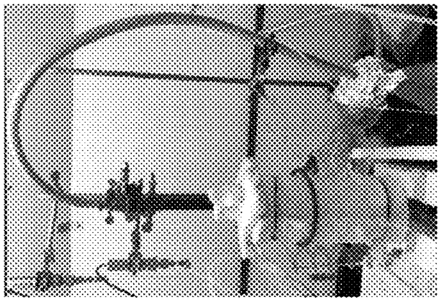
FIGS. 13A-13F show photographs of carbon being removed from a heat transfer media containing a PCM as described in the Examples.
Figure 13B:
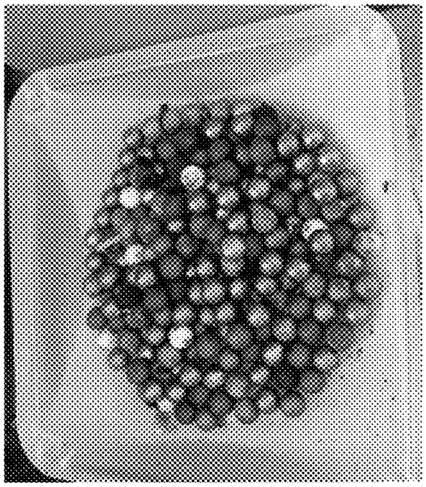
Figure 13C:
Figure 13D:
Figure 13E:
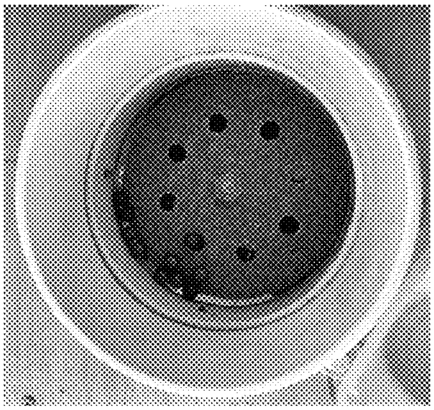
Figure 13F:

FIG. 12 illustrates a process flow diagram where the PCM heat transfer media is used for thermal energy storage. In this embodiment, the PCM heat transfer media is held stationary in a vessel. A primary heat transfer media exchanges heat with a PCM heat transfer media. The primary heat transfer media transfers heat to the reacting gas. The primary heat transfer media can be a solid, gas, or liquid. The PCM heat transfer media could remain stationary or be transported through a heat transfer loop such that heat input and extraction from the PCM heat transfer media occurs in different locations. Within this system, the bed of heat transfer media containing the PCM can ensure a consistent heat source for the primary heat transfer fluid at a near constant temperature. This embodiment allows for decoupling of the heat input to the system and the heat consumption by the process. For example, the heat transfer media containing a PCM can serve as a heat capacitor within the system to smooth any fluctuations in heat supplied by the heater.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

FIGS. 13A-13F show an example of carbon deposition and ex-situ carbon removal from a solid media. An experiment was conducted by depositing carbon on solid alumina spheres in a packed bed reactor operated at 1200° C. under methane flow. The carbon coated media was removed from the reactor and sieving and attrition were used to remove the deposited carbon from the media outer surface. As shown, approximately 0.24 wt. % carbon was removed via sieving. The carbon removed was mirror like and likely surface carbon on the particles and carbon from the reactor walls. Balls cleaned via attrition were treated on a 4.5" wheel spinning at ¾ power (~2000 rpm) with 40 grit sandpaper. The process was used to treat 10 particles by being treated for 1 minute followed by weighing, and then be treated for another 5 minutes followed by weighing. The following Table 1 demonstrates the feasibility of carbon removal via abrasion.

| Trial | % wt loss (1 min) | % wt loss (5 min) | % wt loss (sieve + 1 + 5 min) |
|---|---|---|---|
| 1 | 0.25 | 0.51 | 1.00 |
| 2 | 0.17 | 0.19 | 0.60 |
| 3 | 0.08 | 0.24 | 0.56 |
| Average | 0.17 | 0.31 | 0.72 |

Thus, the results demonstrate the ability to remove carbon from the heat transfer media using sieving and/or abrasion/attrition.

Having described various systems and methods, certain aspects can include, but are not limited to:

In a first aspects, a heat transfer media comprises: a particle, wherein the particle comprises: a discontinuous phase; and a matrix material, wherein the discontinuous phase is disposed within the matrix material, wherein the matrix material has a higher melting point than the discontinuous phase, and wherein the discontinuous phase has a melting point selected to be within a reaction temperature range.

A second aspect can include the composite media of the first aspect, wherein the discontinuous phase is configured to change phase from a liquid to a solid within the reaction temperature range.

A third aspect can include the composite media of the first or second aspect, wherein the discontinuous phase has a melting point in a range of from 500-1500° C.

A fourth aspect can include the composite media of any one of the first to third aspects, wherein the particle has a diameter of between about 0.01-10 inches.

A fifth aspect can include the composite media of any one of the first to fourth aspects, wherein the discontinuous phase comprises a metal or a metal alloy.

A sixth aspect can include the composite media of any one of the first to fifth aspects, wherein the discontinuous phase comprises Fe, Al, Si, B, Mn, Cu, or alloys thereof.

A seventh aspect can include the composite media of any one of the first to sixth aspects, wherein the discontinuous phase comprises at least one of: Fe—Si—B, Fe—Si, Al—Si, Mn—Si, or combinations thereof.

An eighth aspect can include the composite media of any one of the first to seventh aspects, wherein the discontinuous phase comprises a metal oxide.

A ninth aspect can include the composite media of any one of the first to eighth aspects, wherein the discontinuous phase comprises a salt.

A tenth aspect can include the composite media of any one of the first to ninth aspects, wherein the particle further comprises: a shell material disposed about the matrix phase comprised of carbon and/or oxides, nitrides, or carbides including but not limited to the following elements: B, Si, Al, Ti, or combinations thereof.

An eleventh aspect can include the composite media of the tenth aspect, wherein the shell material comprises carbon and/or oxides, nitrides, or carbides including but not limited to the following elements: B, Si, Al, Ti, or combinations thereof.

In a twelfth aspect, a method of conducting a reaction with a heat transfer media comprises: heating a heat transfer media, wherein the heat transfer media comprises a phase change material; melting the phase change material within the heat transfer media in response to heating the heat transfer media; contacting a reactant with the heat transfer media to form one or more products; and solidifying at least a portion of the phase change material during the contacting.

A thirteenth aspect can include the method of the twelfth aspect, wherein the reactant comprises a hydrocarbon, and wherein the one or more products comprise carbon and hydrogen.

A fourteenth aspect can include the method of the twelfth or thirteenth aspect, wherein the heat transfer media comprises: a particle, wherein the particle comprises: a discontinuous phase comprising the phase change material; and a matrix material, wherein the discontinuous phase is disposed within the matrix material, wherein the matrix material has a higher melting point than the discontinuous phase, and wherein the discontinuous phase has a melting point selected to be within a reaction temperature range.

A fifteenth aspect can include the method of any one of the twelfth to fourteenth aspects, wherein the contacting occurs at a temperature in the range of 500-1500° C.

A sixteenth aspect can include the method of any one of the twelfth to fifteenth aspects, wherein the discontinuous phase has a melting point in a range of from 500-1500° C.

A seventeenth aspect can include the method of any one of the twelfth to sixteenth aspects, wherein the particle has a diameter of between about 0.01-10 inches.

An eighteenth aspect can include the method of any one of the twelfth to seventeenth aspects, wherein the discontinuous phase comprises a metal or a metal alloy.

A nineteenth aspect can include the method of any one of the twelfth to eighteenth aspects, wherein the discontinuous phase comprises Fe, Al, Si, B, Mn, Cu, or alloys thereof.

A twentieth aspect can include the method of any one of the twelfth to nineteenth aspects, wherein the discontinuous phase comprises at least one of: Fe—Si—B, Fe—Si, Al—Si, Mn—Si, or combinations thereof.

A twenty first aspect can include the method of any one of the twelfth to twentieth aspects, wherein the discontinuous phase comprises a metal oxide.

A twenty second aspect can include the method of any one of the twelfth to twenty first aspects, wherein the discontinuous phase comprises a salt.

A twenty third aspect can include the method of any one of the twelfth to twenty second aspects, wherein the particle further comprises: a shell material disposed about the matrix phase comprised of carbon and/or oxides, nitrides, or carbides including but not limited to the following elements: B, Si, Al, Ti, or combinations thereof.

A twenty fourth aspect can include the method of the twenty third aspect, wherein the shell material comprises carbon and/or oxides, nitrides, or carbides including but not limited to the following elements: B, Si, Al, Ti, or combinations thereof.

In a twenty fifth aspect, a moving bed reactor comprises: a housing; a core section disposed within the housing; a first heat transfer media disposed within the core section; an annular section disposed within the housing; a second heat transfer media disposed within the annular section; and a reactor wall, wherein the reactor wall is disposed within the housing, wherein the reactor wall is disposed between and defines the core section and the annular section.

A twenty sixth aspect can include the reactor of the twenty fifth aspect, wherein the reactor wall forms a seal within the housing, wherein the seal separates the core section from the annular section.

A twenty seventh aspect can include the reactor of the twenty fifth or twenty sixth aspect, wherein the first heat transfer media forms a first moving bed within the core section.

A twenty eighth aspect can include the reactor of any one of the twenty fifth to twenty seventh aspects, wherein the second heat transfer media forms a second moving bed within the annular section.

A twenty ninth aspect can include the reactor of any one of the twenty fifth to twenty eighth aspects, further comprising: a first transport device coupled to the core section, wherein the first transport device is configured to transport the first heat transfer media from a lower portion of the core section to an upper portion of the core section.

A thirtieth aspect can include the reactor of any one of the twenty fifth to twenty ninth aspects, further comprising: a second transport device coupled to the annular section, wherein the second transport device is configured to transport the second heat transfer media from a lower portion of the annular section to an upper portion of the annular section.

A thirty first aspect can include the reactor of any one of the twenty fifth to thirtieth aspects, further comprising: a heater disposed in an upper portion of the core section, wherein the heat is configured to heat the first heat transfer media in the upper portion of the core section.

A thirty second aspect can include the reactor of any one of the twenty fifth to thirty first aspects, further comprising: a lower gas manifold, wherein the lower gas manifold provides fluid communication from the annular section to the core section through the reactor wall in a lower portion of the core section; an upper gas manifold, wherein the upper gas manifold provides fluid communication from the core section to the annular section through the reactor wall in an upper portion of the core section, wherein the lower gas manifold and the upper gas manifold are configured to provide a reactant gas pathway from the annular section into the core section through the lower gas manifold, through a reaction zone in the core section, and from an upper portion of the core section to the annular section through the upper gas manifold.

A thirty third aspect can include the reactor of any one of the twenty fifth to thirty second aspects, further comprising: a gas inlet disposed in a lower portion of the annular section, wherein the gas inlet is configured to provide fluid communication of a reactant into the lower portion of the annular section.

A thirty fourth aspect can include the reactor of any one of the twenty fifth to thirty second aspects, further comprising: a gas outlet disposed in an upper portion of the annular section, wherein the gas outlet is configured to provide fluid communication of a product out of the upper portion of the annular section.

A thirty fifth aspect can include the reactor of any one of the twenty fifth to thirty fourth aspects, wherein the first heat transfer media has a first average particle diameter, wherein the second heat transfer media has a second average particle diameter, and wherein the first average particle diameter is larger than the second average particle diameter.

A thirty sixth aspect can include the reactor of the thirty fifth aspect, wherein the first heat transfer media has a first average void fraction, wherein the second heat transfer media has a second average void fraction, and wherein the first average void fraction is higher than the second average void fraction.

A thirty seventh aspect can include the reactor of the thirty fifth or thirty sixth aspect, wherein the first heat transfer media is configured to provide a first volumetric gas flowrate, wherein the second heat transfer media is configured to provide a second volumetric gas flowrate, and wherein the first volumetric gas flowrate is greater than the second volumetric gas flowrate.

A thirty eighth aspect can include the reactor of the thirty seventh aspect, wherein the first volumetric gas flowrate is greater than 2× that of the second volumetric gas flowrate.

A thirty ninth aspect can include the reactor of the thirty seventh aspect, wherein the first volumetric gas flowrate is greater than 4× that of the second volumetric gas flowrate.

A fortieth aspect can include the reactor of any one of the twenty fifth to thirty ninth aspects, wherein annular section comprises one or more gas flow restrictions between a lower portion of the annular section and an upper portion of the annular section.

A forty first aspect can include the reactor of the fortieth aspect, wherein the one or more gas flow restrictions comprise a reduced cross-sectional flow area as compared to a cross-sectional flow area of a lower portion of the annular section or an upper portion of the annular section.

A forty second aspect can include the reactor of the fortieth or forty first aspect, wherein the one or more gas flow restriction comprise one or more flow restrictions.

A forty third aspect can include the reactor of any one of the twenty fifth to forty second aspects, further comprising: a blanket gas inlet in fluid communication with an upper section of the core section, wherein the blanket gas inlet is configured to provide a blanket gas into the upper portion of the core section.

A forty fourth aspect can include the reactor of the forty third aspect, further comprising: the blanket gas disposed in the upper portion of the core section.

A forty fifth aspect can include the reactor of the forty fourth aspect, wherein the blanket gas comprises an inert gas.

A forty sixth aspect can include the reactor of the forty fourth aspect, wherein the blanket gas comprises a non-carbon containing gas.

A forty seventh aspect can include the reactor of the forty fourth aspect, wherein the blanket gas comprises hydrogen.

A fortieth eighth aspect can include the reactor of any one of the twenty fifth to forty seventh aspects, wherein the first heat transfer media comprises: a particle, wherein the particle comprises: a discontinuous phase; and a matrix material, wherein the discontinuous phase is disposed within the matrix material, wherein the matrix material has a higher melting point than the discontinuous phase, and wherein the discontinuous phase has a melting point selected to be within a reaction temperature range.

A forty ninth aspect can include the reactor of the forty eighth aspect, wherein the discontinuous phase is configured to change phase from a liquid to a solid within the reaction temperature range.

A fiftieth aspect can include the reactor of the forty eighth or forty ninth aspect, wherein the discontinuous phase has a melting point in a range of from 500-1500° C.

A fifty first aspect can include the reactor of any one of the forty eighth to fiftieth aspects, wherein the particle has a diameter of between about 0.01-10 inches.

A fifty second aspect can include the reactor of any one of the forty eighth to fifty first aspects, wherein the discontinuous phase comprises a metal or a metal alloy.

A fifty third aspect can include the reactor of any one of the forty eighth to fifty second aspects, wherein the discontinuous phase comprises Fe, Al, Si, B, Mn, Cu, or alloys thereof.

A fifty fourth aspect can include the reactor of any one of the forty eighth to fifty third aspects, wherein the discontinuous phase comprises at least one of. Fe—Si—B, Fe—Si, Al—Si, Mn—Si, or combinations thereof.

A fifty fifth aspect can include the reactor of any one of the forty eighth to fifty fourth aspects, wherein the discontinuous phase comprises a metal oxide.

A fifty sixth aspect can include the reactor of any one of the forty eighth to fifty fifth aspects, wherein the discontinuous phase comprises a salt.

A fifty seventh aspect can include the reactor of any one of the forty eighth to fifty sixth aspects, wherein the particle further comprises: a shell material disposed about the matrix phase comprised of carbon and/or oxides, nitrides, or carbides including but not limited to the following elements: B, Si, Al, Ti, or combinations thereof.

A fifty eighth aspect can include the reactor of the fifty seventh, wherein the shell material comprises carbon and/or oxides, nitrides, or carbides including but not limited to the following elements: B, Si, Al, Ti, or combinations thereof.

In a fifty ninth aspect, a method of performing a pyrolysis reaction comprises: introducing a reactant gas into a lower portion of an annular section of a reactor, wherein the reactant gas comprises a hydrocarbon gas, and wherein the annular section comprises a second heat transfer media; passing at least a first portion the reactant gas from the lower portion of the annular section into a lower portion of a core section of the reactor; contacting the first portion reactant gas with a first heat transfer media within the core section of the reactor; pyrolyzing at least a portion of the first portion of the reactant gas within the core section based on the contacting to form reaction products, wherein the reaction products comprise solid carbon and hydrogen; passing the reaction products from an upper portion of the core section to an upper portion of the annular section; and collecting reaction products from the upper portion of the annular section as a product.

A sixtieth aspect can include the method of the fifty ninth aspect, further comprising: heating the reactant gas in the lower portion of the annular section prior to passing the first portion of the reactant gas from the lower portion of the annular section into the lower portion of the core section, wherein the heating is based on indirect heat exchange between the first heat transfer media and the second heat transfer media.

A sixty first aspect can include the method of the fifty ninth or sixtieth aspect, further comprising: circulating the first heat transfer media through the core section during the pyrolysis process.

A sixty second aspect can include the method of the sixty first aspect, wherein circulating the first heat transfer media comprises: passing the first heat transfer media from an upper portion of the core section to a lower portion of the core section; removing the first heat transfer media from the lower portion of the core section; and transporting the first heat transfer media from the lower portion of the core section to an upper portion of the core section.

A sixty third aspect can include the method of any one of the fifty ninth to sixty first aspects, further comprising:

circulating the second heat transfer media through the annular section during the pyrolysis process.

A sixty fourth aspect can include the method of the sixty third aspect, wherein circulating the second heat transfer media comprises: passing the second heat transfer media from an upper portion of the annular section to a lower portion of the annular section; removing the second heat transfer media from the lower portion of the annular section; and transporting the second heat transfer media from the lower portion of the annular section to an upper portion of the annular section.

A sixty fifth aspect can include the method of any one of the fifty ninth to sixty fourth aspects, further comprising: removing solid carbon from the first heat transfer media after pyrolyzing at least the portion of the first portion of the reactant gas; and collecting the solid carbon as a product.

A sixty sixth aspect can include the method of any one of the fifty ninth to sixty fifth aspects, wherein the reactor comprises: a housing; the core section disposed within the housing; the first heat transfer media disposed within the core section; the annular section disposed within the housing; the second heat transfer media disposed within the annular section; and a reactor wall, wherein the reactor wall is disposed within the housing, wherein the reactor wall is disposed between and defines the core section and the annular section.

A sixty seventh aspect can include the method of the sixty sixth aspect, further comprising: sealing the core section from the annular section with the reactor wall.

A sixty eighth aspect can include the method of any one of the fifty ninth to sixty seventh aspects, further comprising: heating the first heat transport media in a heating zone in the upper portion of the core section prior to contacting the first portion of the reactant gas with the first heat transfer media within the core section of the reactor.

A sixty ninth aspect can include the method of any one of the fifty ninth to sixty eighth aspects, wherein passing the first portion of the reactant gas from the lower portion of the annular section into the lower portion of the core section comprises: passing the first portion of the reactant gas from the lower portion of the annular section through a lower gas manifold; and distributing the first portion of the reactant gas within the core section using the lower gas manifold; wherein passing the reaction products from the upper portion of the core section to the upper portion of the annular section comprises: passing the reaction products from the upper portion of the core section into the upper portion of the annular section through an upper gas manifold.

A seventieth aspect can include the method of any one of the fifty ninth to sixty ninth aspects, wherein the first heat transfer media has a first average particle diameter, wherein the second heat transfer media has a second average particle diameter, and wherein the first average particle diameter is larger than the second average particle diameter.

A seventy first aspect can include the method of the seventieth aspect, wherein the first heat transfer media has a first average void fraction, wherein the second heat transfer media has a second average void fraction, and wherein the first average void fraction is higher than the second average void fraction.

A seventy second aspect can include the method of the seventieth or seventy first aspect, wherein the first heat transfer media is configured to provide a first volumetric gas flowrate, wherein the second heat transfer media is configured to provide a second volumetric gas flowrate, and wherein the second volumetric gas flowrate is less than the first volumetric gas flowrate.

A seventy third aspect can include the method of the seventy second aspect, wherein the second volumetric gas flowrate is less than half of the first volumetric gas flowrate.

A seventy fourth aspect can include the method of the seventy second aspect, wherein the second volumetric gas flowrate is less than one tenth of the first volumetric gas flowrate.

A seventy fifth aspect can include the method of the seventieth aspect, further comprising: passing a second portion of the reactant gas from the lower portion of the annular section to the upper portion of the annular section through the annular section.

A seventy sixth aspect can include the method of the seventy fifth aspect, wherein a volumetric flowrate ratio of the first portion of the reactant gas to the second portion of the reactant gas is in a range of 2:1 to 100:1.

A seventy seventh aspect can include the method of any one of the fifty ninth to seventy sixth aspects, wherein the annular section comprises one or more gas flow restrictions between a lower portion of the annular section and an upper portion of the annular section.

A seventy eighth aspect can include the method of the seventy seventh aspect, wherein the one or more gas flow restrictions comprise a reduced cross-sectional flow area as compared to a cross-sectional flow area of a lower portion of the annular section or an upper portion of the annular section.

A seventy ninth aspect can include the method of any one of the fifty ninth to seventy eighth aspects, further comprising: injecting a blanket gas into the upper section of the core section, wherein the blanket gas inlet is configured to provide a blanket gas into the upper portion of the core section.

An eightieth aspect can include the method of the seventy ninth aspect, wherein the blanket gas comprises an inert gas.

An eighty first aspect can include the method of the eightieth aspect, wherein the blanket gas comprises a non-carbon containing gas.

An eighty second aspect can include the method of the eighty first aspect, wherein the blanket gas comprises hydrogen.

An eighty third aspect can include the method of any one of the fifty ninth to eighty second aspects, wherein the first heat transfer media comprises: a particle, wherein the particle comprises: a discontinuous phase; and a matrix material, wherein the discontinuous phase is disposed within the matrix material, wherein the matrix material has a higher melting point than the discontinuous phase, and wherein the discontinuous phase has a melting point selected to be within a reaction temperature range.

An eighty fourth aspect can include the method of the eighty third aspect, further comprising: melting the discontinuous phase upon heating in the upper portion of the core section.

An eighty fifth aspect can include the method of the eighty third or eighty fourth aspect, wherein the discontinuous phase has a melting point in a range of from 500-1500° C.

An eighty sixth aspect can include the method of any one of the eighty third to eighty fifth aspects, wherein the particle has a diameter of between about 0.01-10 inches.

An eighty seventh aspect can include the method of any one of the eighty third to eighty sixth aspects, wherein the discontinuous phase comprises a metal or a metal alloy.

An eighty eighth aspect can include the method of any one of the eighty third to eighty seventh aspects, wherein the discontinuous phase comprises Fe, Al, Si, B, Mn, Cu, or alloys thereof.

An eighty ninth aspect can include the method of any one of the eighty third to eighty eighth aspects, wherein the discontinuous phase comprises at least one of: Fe—Si—B, Fe—Si, Al—Si, Mn—Si, or combinations thereof.

A ninetieth aspect can include the method of any one of the eighty third to eighty ninth aspects, wherein the discontinuous phase comprises a metal oxide.

A ninety first aspect can include the method of any one of the eighty third to ninetieth aspects, wherein the discontinuous phase comprises a salt.

A ninety second aspect can include the method of any one of the eighty third to ninety first aspects, wherein the particle further comprises: a shell material disposed about the matrix phase comprised of carbon and/or oxides, nitrides, or carbides including but not limited to the following elements: B, Si, Al, Ti, or combinations thereof.

A ninety third aspect can include the method of the ninety second aspect, wherein the shell material comprises carbon and/or oxides, nitrides, or carbides including but not limited to the following elements: B, Si, Al, Ti, or combinations thereof.

In a ninety fourth aspect, a thermal energy storage system comprises: a heating element; a heat transfer media comprising a phase change material (PCM); and a heat transfer fluid in contact with the heat transfer media.

A ninety fifth aspect can include the system of the ninety fourth aspect, wherein the heat transfer media forms a stationary bed, and wherein the heat transfer fluid is configured to pass over the heat transfer media.

A ninety sixth aspect can include the system of the ninety fourth or ninety fifth aspect, wherein the heating element is configured to heat the heat transfer media.

A ninety seventy aspect can include the system of any one of the ninety fourth to ninety sixth aspects, wherein the heat transfer media comprises the heat transfer media of any one of the first to eleventh aspects.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically, and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A moving bed reactor comprising:

a housing;

a core section disposed within the housing;

a first heat transfer media disposed within the core section;

an annular section disposed within the housing;

a second heat transfer media disposed within the annular section;

a heater disposed in an upper portion of the core section, wherein the heater is configured to heat the first heat transfer media in the upper portion of the core section; and a reactor wall, wherein the reactor wall is disposed within the housing, wherein the reactor wall is disposed between and defines the core section and the annular section, wherein the first heat transfer media has a first average particle diameter, wherein the second heat transfer media has a second average particle diameter, and wherein the first average particle diameter is larger than the second average particle diameter.

2. The reactor of claim 1, wherein the reactor wall forms a seal within the housing, wherein the seal separates the core section from the annular section.

3. The reactor of claim 1, wherein the first heat transfer media forms a first moving bed within the core section, and wherein the second heat transfer media forms a second moving bed within the annular section.

4. The reactor of claim 1, further comprising:

a first transport device coupled to the core section, wherein the first transport device is configured to transport the first heat transfer media from a lower portion of the core section to an upper portion of the core section.

5. The reactor of claim 4, further comprising:

a second transport device coupled to the annular section, wherein the second transport device is configured to transport the second heat transfer media from a lower portion of the annular section to an upper portion of the annular section.

6. The reactor of claim 1, further comprising:

a gas inlet disposed in a lower portion of the annular section, wherein the gas inlet is configured to provide fluid communication of a reactant into the lower portion of the annular section; and a gas outlet disposed in an upper portion of the annular section, wherein the gas outlet is configured to provide fluid communication of a product out of the upper portion of the annular section.

7. The reactor of claim 1, wherein the first heat transfer media is configured to provide a first volumetric gas flowrate, wherein the second heat transfer media is configured to provide a second volumetric gas flowrate, and wherein the first volumetric gas flowrate is greater than the second volumetric gas flowrate.

8. The reactor of claim 1, further comprising:

a blanket gas inlet in fluid communication with an upper section of the core section, wherein the blanket gas inlet is configured to provide a blanket gas into the upper portion of the core section.

9. The reactor of claim 1, wherein the first heat transfer media comprises:

a particle, wherein the particle comprises:

a discontinuous phase; and a matrix material, wherein the discontinuous phase is disposed within the matrix material, wherein the matrix material has a higher melting point than the discontinuous phase, and wherein the discontinuous phase has a melting point selected to be within a reaction temperature range.

10. The reactor of claim 9, wherein the discontinuous phase is configured to change phase from a liquid to a solid within the reaction temperature range.

11. The reactor of claim 9, wherein the discontinuous phase comprises a metal or a metal alloy.

12. The reactor of claim 9, wherein the discontinuous phase comprises Fe, Al, Si, B, Mn, Cu, or alloys thereof.

13. The reactor of claim 9, wherein the discontinuous phase comprises Fe—Si—B, Fe—Si, Al—Si, Mn—Si, or a combination thereof.

14. The reactor of claim 9, wherein the discontinuous phase comprises a metal oxide.

15. The reactor of claim 9, wherein the discontinuous phase comprises a salt.

16. The reactor of claim 1, wherein the first heat transfer media has a first average void fraction, wherein the second heat transfer media has a second average void fraction, and wherein the first average void fraction is higher than the second average void fraction.

17. A moving bed reactor comprising:

a housing;

a core section disposed within the housing;

a first heat transfer media disposed within the core section;

an annular section disposed within the housing;

a second heat transfer media disposed within the annular section;

a reactor wall, wherein the reactor wall is disposed within the housing, wherein the reactor wall is disposed between and defines the core section and the annular section;

a lower gas manifold, wherein the lower gas manifold provides fluid communication from the annular section to the core section through the reactor wall in a lower portion of the core section; and an upper gas manifold, wherein the upper gas manifold provides fluid communication from the core section to the annular section through the reactor wall in an upper portion of the core section, wherein the lower gas manifold and the upper gas manifold are configured to provide a reactant gas pathway from the annular section into the core section through the lower gas manifold, through a reaction zone in the core section, and from the upper portion of the core section to the annular section through the upper gas manifold.

18. A moving bed reactor comprising:

a housing;

a core section disposed within the housing;

a first heat transfer media disposed within the core section;

an annular section disposed within the housing;

a second heat transfer media disposed within the annular section; and a reactor wall, wherein the reactor wall is disposed within the housing, wherein the reactor wall is disposed between and defines the core section and the annular section, wherein the first heat transfer media comprises:

a particle, wherein the particle comprises:

a discontinuous phase; and a matrix material, wherein the discontinuous phase is disposed within the matrix material, wherein the matrix material has a higher melting point than the discontinuous phase, and wherein the discontinuous phase has a melting point selected to be within a reaction temperature range, and wherein the particle further comprises: a shell material disposed about the matrix material, and wherein the shell material comprises C, B, Si, Al, Ti; an oxide of one or more of B, Si, Al, Ti; a nitride of one or more of B, Si, Al, Ti; a carbide of one or more of B, Si, Al, Ti; or a combination thereof.

19. A moving bed reactor comprising:

a housing;

a core section disposed within the housing;

a first heat transfer media disposed within the core section;

an annular section disposed within the housing;

a second heat transfer media disposed within the annular section; and a reactor wall, wherein the reactor wall is disposed within the housing, wherein the reactor wall is disposed between and defines the core section and the annular section, wherein the annular section comprises one or more gas flow restrictions between a lower portion of the annular section and an upper portion of the annular section, and wherein the first heat transfer media has a first average particle diameter, wherein the second heat transfer media has a second average particle diameter, and wherein the first average particle diameter is larger than the second average particle diameter.

20. The reactor of claim 19, wherein the one or more gas flow restrictions comprise a reduced cross-sectional flow area as compared to a cross-sectional flow area of the lower portion of the annular section or the upper portion of the annular section.

* * * * *